US009251465B2

(12) United States Patent
Cox et al.

(10) Patent No.: US 9,251,465 B2
(45) Date of Patent: *Feb. 2, 2016

(54) SYSTEM AND METHODS FOR INTERACTIVE DISPLAYS BASED ON ASSOCIATIONS FOR MACHINE-GUIDED RULE CREATION

(71) Applicant: SAS Institute Inc., Cary, NC (US)

(72) Inventors: James Allen Cox, Cary, NC (US); Zheng Zhao, Cary, NC (US); Arila Barnes, Belmont, MA (US); Jared Peterson, Cary, NC (US); Samantha DuPont, Raleigh, NC (US); Russel Albright, Cary, NC (US); Barry DeVille, Holly Springs, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,443

(22) Filed: Mar. 19, 2015

(65) Prior Publication Data

US 2015/0193523 A1   Jul. 9, 2015

Related U.S. Application Data

(63) Continuation of application No. 14/337,203, filed on Jul. 21, 2014, now Pat. No. 9,092,734, which is a continuation-in-part of application No. 13/624,052, filed on Sep. 21, 2012, now Pat. No. 8,832,015.

(60) Provisional application No. 62/017,260, filed on Jun. 26, 2014, provisional application No. 61/856,199, filed on Jul. 19, 2013.

(51) Int. Cl.
*G06F 17/00* (2006.01)
*G06N 5/02* (2006.01)
(Continued)

(52) U.S. Cl.
CPC ............... *G06N 5/025* (2013.01); *G06F 17/30* (2013.01); *G06F 17/30507* (2013.01);
(Continued)

(58) Field of Classification Search
None
See application file for complete search history.

(56) References Cited

U.S. PATENT DOCUMENTS 6,272,478 B1   8/2001   Obata et al.
6,311,173 B1   10/2001   Levin et al.
(Continued)

OTHER PUBLICATIONS

Cohen, William W. et al., "Context-Sensitive Learning Methods for Text Categorization" AT&T Labs, ACM Transactions on Information Systems vol. 17, No. 2 Apr. 1999, pp. 141-173.
(Continued)

*Primary Examiner* — Wilbert L Starks
*Assistant Examiner* — Luis Sitiriche
(74) *Attorney, Agent, or Firm* — Kilpatrick Townsend & Stockton LLP

(57) ABSTRACT

This disclosure provides a computer-program product, system, method and apparatus for accessing a representation of a category or item and accessing a set of multiple transactions. The transactions are processed to identify items found amongst the transactions, and the items are ordered based on an information-gain heuristic. A depth-first search for a group of best association rules is then conducted using a best-first heuristic and constraints that make the search efficient. The best rules found during the search can then be displayed to a user, along with accompanying statistics. The user can then select rules that appear to be most relevant, and further analytics can be applied to the selected rules to obtain further information about the information provided by these rules.

27 Claims, 23 Drawing Sheets

(51) Int. Cl.
  *G06N 5/04*   (2006.01)
  *G06F 17/30*  (2006.01)
  *G06Q 40/00*  (2012.01)
  *G06Q 40/06*  (2012.01)
(52) U.S. Cl.
  CPC ... *G06F 17/30598* (2013.01); *G06F 17/30961* (2013.01); *G06N 5/027* (2013.01); *G06N 5/04* (2013.01); *G06Q 40/00* (2013.01); *G06Q 40/06* (2013.01)

(56) References Cited

U.S. PATENT DOCUMENTS

| | | | |
|---|---|---|---|
| 8,458,232 | B1 | 6/2013 | Spertus et al. |
| 8,832,015 | B2 | 9/2014 | Cox et al. |
| 2009/0055332 | A1 | 2/2009 | Lee |
| 2011/0078650 | A1 | 3/2011 | Weber et al. |
| 2011/0153622 | A1 | 6/2011 | Bhattal et al. |
| 2014/0089247 | A1 | 3/2014 | Cox et al. |
| 2014/0337271 | A1 | 11/2014 | Cox et al. |
| 2014/0337272 | A1 | 11/2014 | Cox et al. |

OTHER PUBLICATIONS

Clark, Peter et al., "The CN2 Induction Algorithm" Machine Learning 3: 1989 Kluwer Academic Publishers—Manufactured in the Netherlands, pp. 261-283.

Huysmans, Johan et al., "Using Rule Extraction to Improve the Comprehensibility of Predictive Models" Department of Decision Sciences and Information Management (KBI), 2006, 56 pages.

Martens, David et al., "Rule Extraction from Support Vector Machines: An Overview of Issues and Application in Credit Scoring" Studies in Computational Intelligence (SCI) Springer-Verlag Heidelberg 2008, 32 pages.

Magnum Opus: the leading data mining software tool for association discovery, retrieved from http://www.giwebb.com/ on Jun. 26, 2014, 1 page.

Fayyad et al., "From Data Mining to Knowledge Discovery in Databases" AI Magazine, vol. 17 No. 3 (1996) 18 pages.

Agrawal et al., Fast Algorithms for Mining Association Rules IBM Almaden Research Center Proc. 20th int. conf. very large data bases, VLDB, Santiago Chile (1994) 13 pages.

Notice of Allowance of Jul. 11, 2014 for U.S. Appl. No. 13/624,052, 16 pages.

Non-Final Office Action of Oct. 1, 2014 for U.S. Appl. No. 14/337,203, 11 pages.

Notice of Allowance of Apr. 10, 2015 for U.S. Appl. No. 14/337,203, 5 pages.

Non-Final Office Action of Oct. 1, 2014 for U.S. Appl. No. 14/337,195, 11 pages.

Notice of Allowance of Apr. 23, 2015 for U.S. Appl. No. 14/337,195, 5 pages.

| Rules | Precision | Recall | F1 |
|---|---|---|---|
| t_shr_446 & t_net_835 | 1.000 | 0.482 | 0.651 |
| t_record_845 & t_cts_447 | 0.995 | 0.681 | 0.809 |
| t_year_58 & t_profit_322 & "t_government_1298 & "t_country_1236 & "t_offer_132 | 0.983 | 0.762 | 0.859 |
| t_cts_447 & "t_price_201 & "t_offer_132 | 0.978 | 0.818 | 0.891 |
| t_dividend_721 & "t_price_201 | 0.971 | 0.851 | 0.907 |
| t_year_58 & t_earnings_554 & "t_export_108 & "t_investor_5414 | 0.955 | 0.882 | 0.917 |
| t_split_338 & "t_market_450 | 0.950 | 0.902 | 0.925 |
| t_qtr_454 & "t_official_1272 | 0.948 | 0.916 | 0.932 |
| t_profit_322 & "t_economic_2850 & "t_pct_390 & "t_net_445 | 0.947 | 0.923 | 0.935 |
| t_loss_513 & "t_government_1298 & t_quarter_473 | 0.944 | 0.931 | 0.937 |
| t_pretax_profit_5822 & "t_pct_390 | 0.944 | 0.934 | 0.939 |
| t_profit_322 & t_pre_tax_6871 | 0.942 | 0.939 | 0.941 |
| t_net_445 & "t_market_400 & "t_min_69 & "t_last_72 & t_income_819 | 0.940 | 0.945 | 0.943 |
| t_loss_513 & "t_government_1298 & t_prior_526 | 0.941 | 0.947 | 0.944 |
| t_loss_513 & t_expense_10077 | 0.940 | 0.949 | 0.945 |
| t_div_753 | 0.940 | 0.951 | 0.946 |
| t_billion_note_1628 | 0.940 | 0.952 | 0.946 |
| t_loss_513 & t_net_loss_846 | 0.939 | 0.954 | 0.947 |
| t_payout_718 | 0.938 | 0.956 | 0.947 |
| t_subs_note_441 | 0.938 | 0.956 | 0.947 |
| t_result_1440 & t_quarter_473 & "t_government_1298 | 0.935 | 0.961 | 0.948 |
| t_net_profit_566 | 0.935 | 0.961 | 0.948 |
| t_stock_dividend_6384 | 0.934 | 0.962 | 0.948 |

FIG. 7

| Potential Rules | F1 |
|---|---|
| t_earnings_554 & ~t_rate_810 & ~t_export_108 (Precision 0.213) | 0.945 |
| t_loss_513 & ~t_foreign_1228 (Precision 0.110) | 0.930 |
| t_sale_375 & t_gain_457 (Precision 0.184) | 0.943 |
| t_result_1440 & ~t_week_32 (Precision 0.065) | 0.912 |
| t_gain_457 & t_sale_375 (Precision 0.184) | 0.943 |
| t_net_445 (Precision 0.056) | 0.919 |
| t_stock_dividend_6984 (Precision 0.194) | 0.948 |
| t_dividend_721 (Precision 0.133) | 0.945 |
| t_shr_446 (Precision 0.157) | 0.947 |
| t_profit_322 (Precision 0.066) | 0.932 |

Best Rule: t_stock_dividend_6984

| Precision | Recall | F1 |
|---|---|---|
| 0.934 | 0.962 | 0.948 |

FIG. 8

| KEY TERMS IN A RULE | Precision | Improvable |
|---|---|---|
| t_net_445 | 0.177 | TRUE |
| t_net_445 & ~t_market_400 | 0.228 | TRUE |
| t_net_445 & ~t_market_400 & t_min_69 | 0.298 | TRUE |
| t_net_445 & ~t_market_400 & t_min_69 & ~t_last_72 | 0.330 | TRUE |
| t_net_445 & ~t_market_400 & t_min_69 & ~t_last_72 & t_income_819 | 0.453 | FALSE |

| Ref.ID | term/rule | in | out | tot | g | dir | prec | est_prec | p_err | _improve |
|---|---|---|---|---|---|---|---|---|---|---|
| A | par | 12 | 5 | 17 | 36.9570 | + | 0.70588 | 0.67222 | 0.03366 | 1 |
| B | putting | 8 | 7 | 15 | 18.0749 | + | 0.53333 | 0.50625 | 0.02708 | 1 |
| C | fairway | 7 | 7 | 14 | 14.6626 | + | 0.50000 | 0.47333 | 0.02667 | 1 |
| D | birdie | 14 | 35 | 49 | 14.2136 | + | 0.28571 | 0.28200 | 0.00371 | 1 |
| E | pga | 3 | 0 | 3 | 13.8974 | + | 1.00000 | 0.77500 | 0.22500 | 0 |
| F | lbat | 1 | 57 | 58 | 6.7805 | - | .01724 | 0.01864 | -.00140 | 1 |

1300

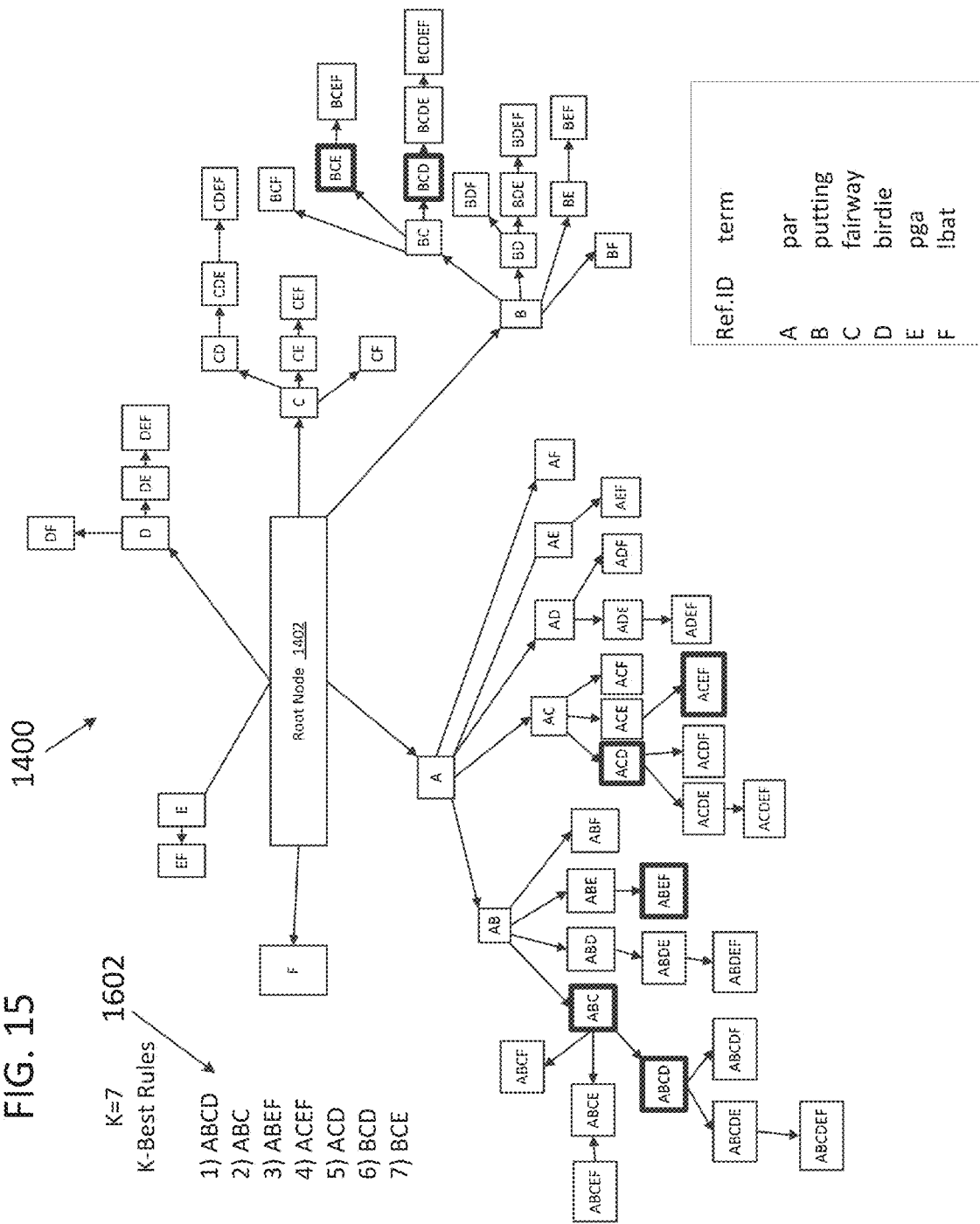

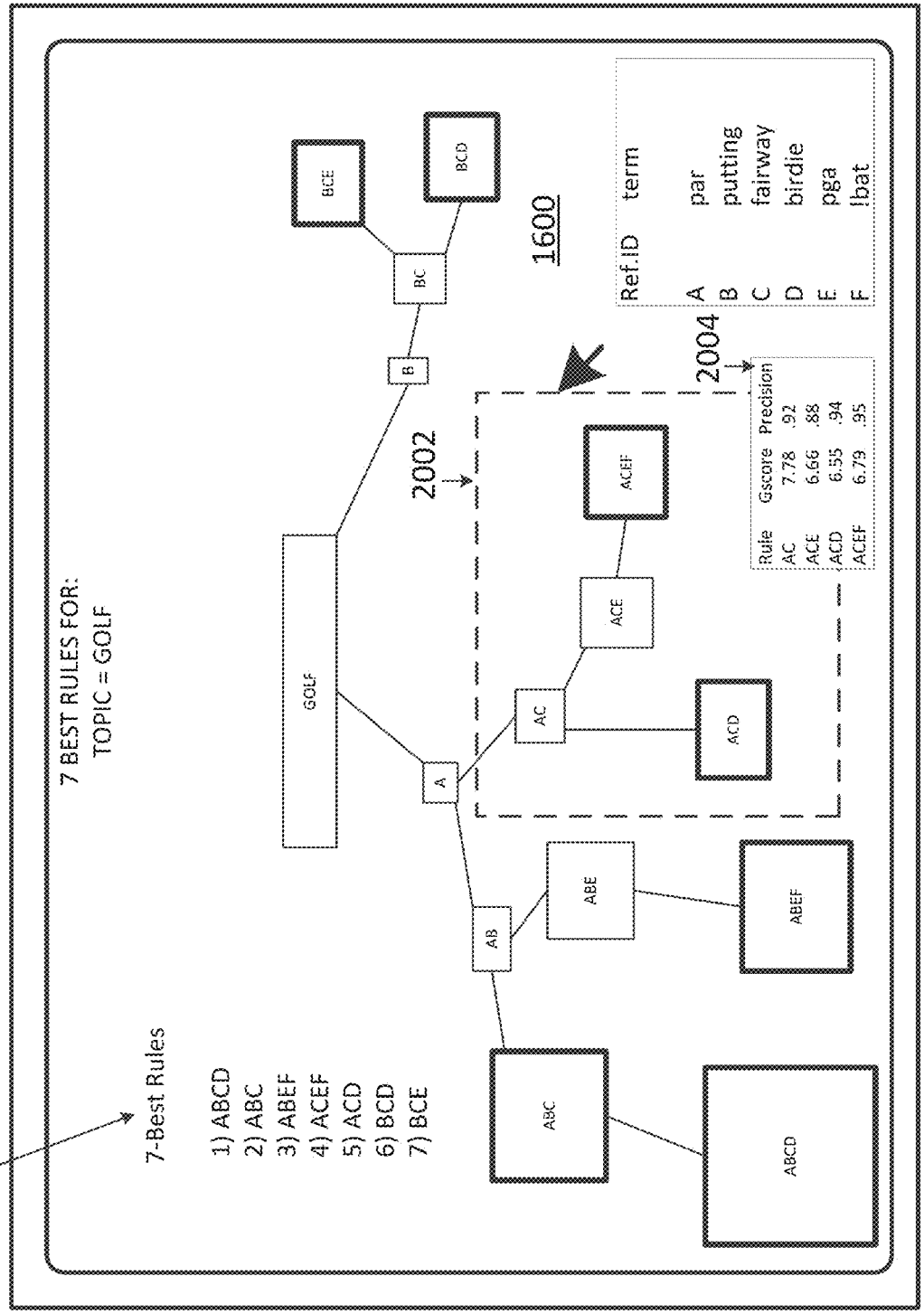

SYSTEM AND METHODS FOR INTERACTIVE DISPLAYS BASED ON ASSOCIATIONS FOR MACHINE-GUIDED RULE CREATION

CROSS REFERENCE TO RELATED APPLICATIONS

This is a Continuation of and claims the benefit and priority of U.S. patent application Ser. No. 14/337,203, filed Jul. 21, 2014, and entitled "SYSTEMS AND METHODS FOR INTERACTIVE DISPLAYS BASED ON ASSOCIATIONS FOR MACHINE-GUIDED RULE CREATION," which is a Continuation-in-Part of and claims the benefit and priority of U.S. Pat. No. 8,832,015, filed on Sep. 21, 2012, entitled "Binary Rule Extraction," and which is further a non-provisional of and claims the benefit and priority under 35 U.S.C. §119(e) of U.S. Provisional App. No. 61/856,199, filed on Jul. 19, 2013, and entitled "Term Map: An Interactive Display Based On Associations For Machine-Guided Rule Creation," and which is also a non-provisional of and claims the benefit and priority under 35 U.S.C. §119(e) of U.S. Provisional App. No. 62/017,260, filed on Jun. 26, 2014, and entitled "AssoCat: An Algorithm For Efficiently Generating k-Maximally Predictive Association Rules With A Given Consequent." All applications listed above are hereby incorporated by reference herein for all purposes.

TECHNICAL FIELD

The technology described in this document relates generally to computer-implemented machine-learning algorithms, and more particularly to systems and methods for generating a rule set to identify data files that have a common characteristic.

BACKGROUND

The popularity of the Internet and the availability of nearly-unlimited data storage capacity have caused large amounts of data to be generated. Within the vast amounts of data, much valuable knowledge and information may be available, if it can be located, for example, by computer-implemented statistical and data mining techniques to locate and categorize unknown data files.

BRIEF DESCRIPTION OF THE FIGURES

FIG. 7 is a table depicting a generation of a rule set by adding rules one-at-a-time to the rule set.

FIG. 8 is a table depicting a number of potential rules for a rule set and a selection of a particular potential rule for the rule set.

FIG. 9 is a table depicting an addition of terms to a rule and a satisfaction of a stopping criterion to discontinue the addition of terms.

FIG. 13 is an example of a preliminary rule list containing six preliminary rules.

FIG. 15 depicts an example search space with bold outlining used to represent seven evaluated rules found to be best during a search conducted within the search space.

FIG. 20 shows an example interface display providing a user with statistical data about association rules.

DETAILED DESCRIPTION

Figure 1A:
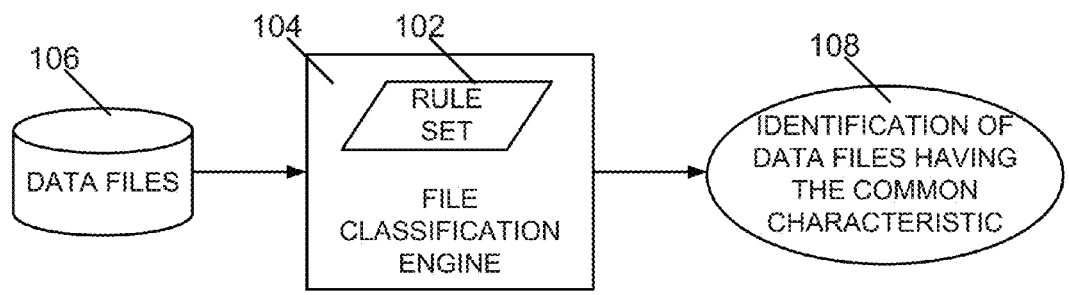
FIGS. 1A and 1B depict example applications of a rule set generated by a rule generation engine.
Figure 1B:
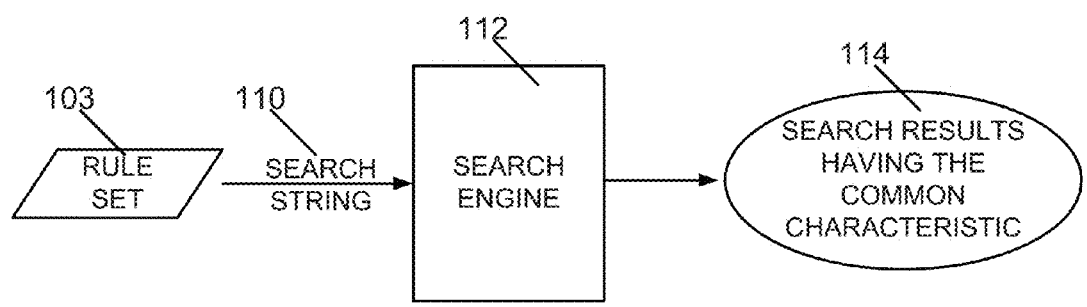

FIGS. 1A and 1B depict example applications of a rule set 102 generated by a rule generation engine. In FIG. 1A, the rule set 102 is used as a component of a computer-implemented file classification engine 104. The computer-implemented file classification engine 104 may be used to automatically classify data files 106 under one or more different categories. Multiple data files classified under a particular category may thus have a common characteristic (i.e., a common subject matter). The rule set 102 used as part of the file classification engine 104 includes one or more rules configured to identify features of the data files 106 that are relevant to or typical of data files having the common characteristic. The file classification engine 104 receives as inputs the unknown, unclassified data files 106 (e.g., articles, book chapters, webpages, reports containing financial data, medical histories, reports containing genetic data for an individual). As output, the classification engine 104 generates one or more binary classifications for the input data files. The binary classifications are used to produce an output identifying which data files of the unknown, unlabeled data files 106 have a common characteristic 108. For example, a file classification engine related to financial markets may receive as inputs random, unlabeled newspaper articles related to a variety of topics, and for each article, the classification engine may produce an output indicating whether the article relates to financial markets or not. The file classification engine related to financial markets may also be capable of producing more specific binary classifications (i.e., whether a given article relates to a particular market, such as the New York Stock Exchange). Using such a computer-implemented file classification engine, relevant newspaper articles can be located automatically, without a need for human intervention or requiring only minimal human intervention.

FIG. 1B depicts use of a rule set 103 to generate search strings 110 to be input into a search engine 112. The rule set 103 may include multiple individual rules, and each of the individual rules may function as a separate search string for the search engine 112. Alternatively, the multiple individual rules of the rule set 103 may be collectively included in the search string 110, with the different rules linked by "OR" operators, for example. Using the search string 110, the search engine 112 returns search results that possess a common characteristic 114. Use of the rule set 103 in this manner may be an efficient method of locating relevant documents on the Internet because the search string 110 based on the rule set 103 identifies key features that have previously been shown to be relevant to the common characteristic.

Figure 2:
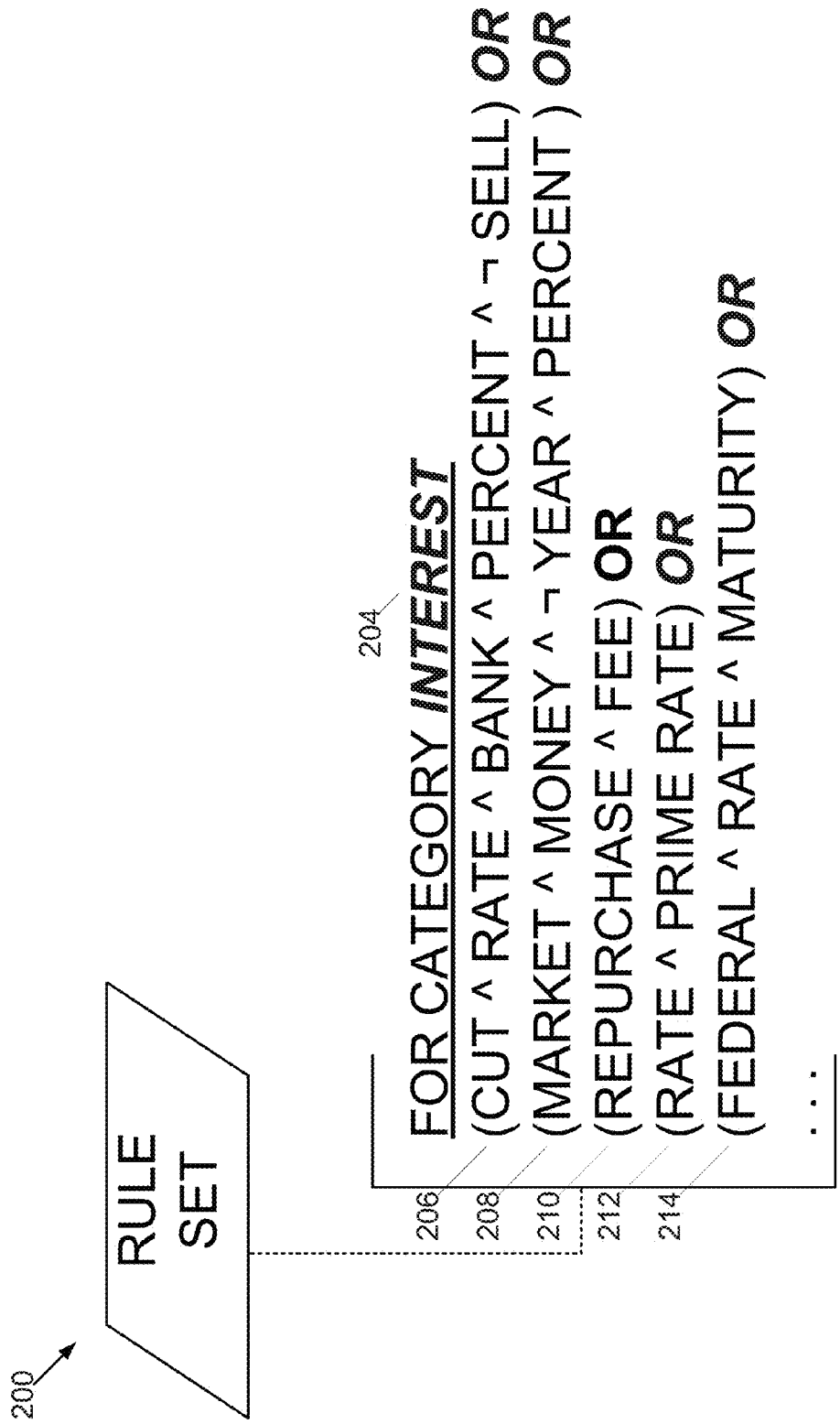
FIG. 2 depicts an example rule set used as part of a computer-implemented file classification engine.

FIG. 2 depicts an example rule set 200 used as part of a computer-implemented file classification engine. In FIG. 2, the rule set 200 is configured to make a binary determination as to whether an unknown, unlabeled file should be classified under a category "interest" 204. The rule set 200 of FIG. 2 includes multiple individual rules 206, 208, 210, 212, 214 conjoined by "OR" operators, such that an unlabeled file that satisfies at least one of the individual rules 206, 208, 210, 212, 214 is classified under the category "interest" 204. The individual rules 206, 208, 210, 212, 214 each include key terms linked by "AND" operators (denoted in FIG. 2 by the "^" symbol). Thus, a particular individual rule is satisfied only if each of its terms is satisfied in the unknown, unlabeled file. Further, particular rule terms are subject to the "NOT" operator (denoted by the "¬" symbol in FIG. 2), thus requiring that such particular terms not be found in the unlabeled file. Thus, for example, a particular file would be classified under the category "interest" 204 if it satisfies the rule 206 by including the words "cut," "rate," "bank," and "percent," and not including the word "sell." Further, if all terms of the rule 206 are not satisfied, the particular file may nevertheless still be classified under the category "interest," if one of the other rules 208, 210, 212, 214 are satisfied. In the example rule set 200, the terms included in the rules 206, 208, 210, 212, 214 may appear in any order and in any location in the unlabeled file.

To build a rule set similar to the example rule set 200 of FIG. 2, training data may be used to train a rule generation engine, which may be used to generate the rule set. The training data may include documents that have been manually reviewed by one or more humans or documents that have been reviewed using a computer algorithm. In one example, the one or more humans manually review training data documents and assign labels (i.e., categories, classifications) to the documents, indicating that documents labeled similarly have a common characteristic. With reference to the example of FIG. 2, the one or more humans may review a plurality of articles, and for each article, determine whether it relates to "interest" or not. By receiving and analyzing the human-labeled training documents, the rule generation engine may identify features of the training documents that are indicative of a document's relationship to a particular category. These identified features may be used to generate rule sets similar to that depicted in FIG. 2.

With reference again to FIG. 2, an example training of a rule generation engine may be performed as follows. The rule generation engine receives a set of labeled data files, where certain of the labeled data files are labeled as relating to the category "interest" 204 and certain of the labeled data files are labeled as not relating to the category. The data files may have been labeled as such by humans or by a computer algorithm. The rule generation engine analyzes the labeled files and may determine that when a document contains the terms "repurchase" and "fee" (as in rule 210 of FIG. 2), the document is always or nearly always labeled as being related to the "interest" category 204. Thus, the rule generation engine generates a rule 210: if an unknown, unlabeled document contains the terms "repurchase" and "fee," then categorize it as relating to the "interest" category 204. Other rules 206, 208, 212, 214 may be generated in this manner and conjoined to the rule set 200 using "OR" operators. The rule set 200 created by the rule generation engine may thereafter be used to determine whether future unknown, unlabeled files should be classified under the "interest" category 204 (e.g., as part of a file classification engine).

Figure 3:
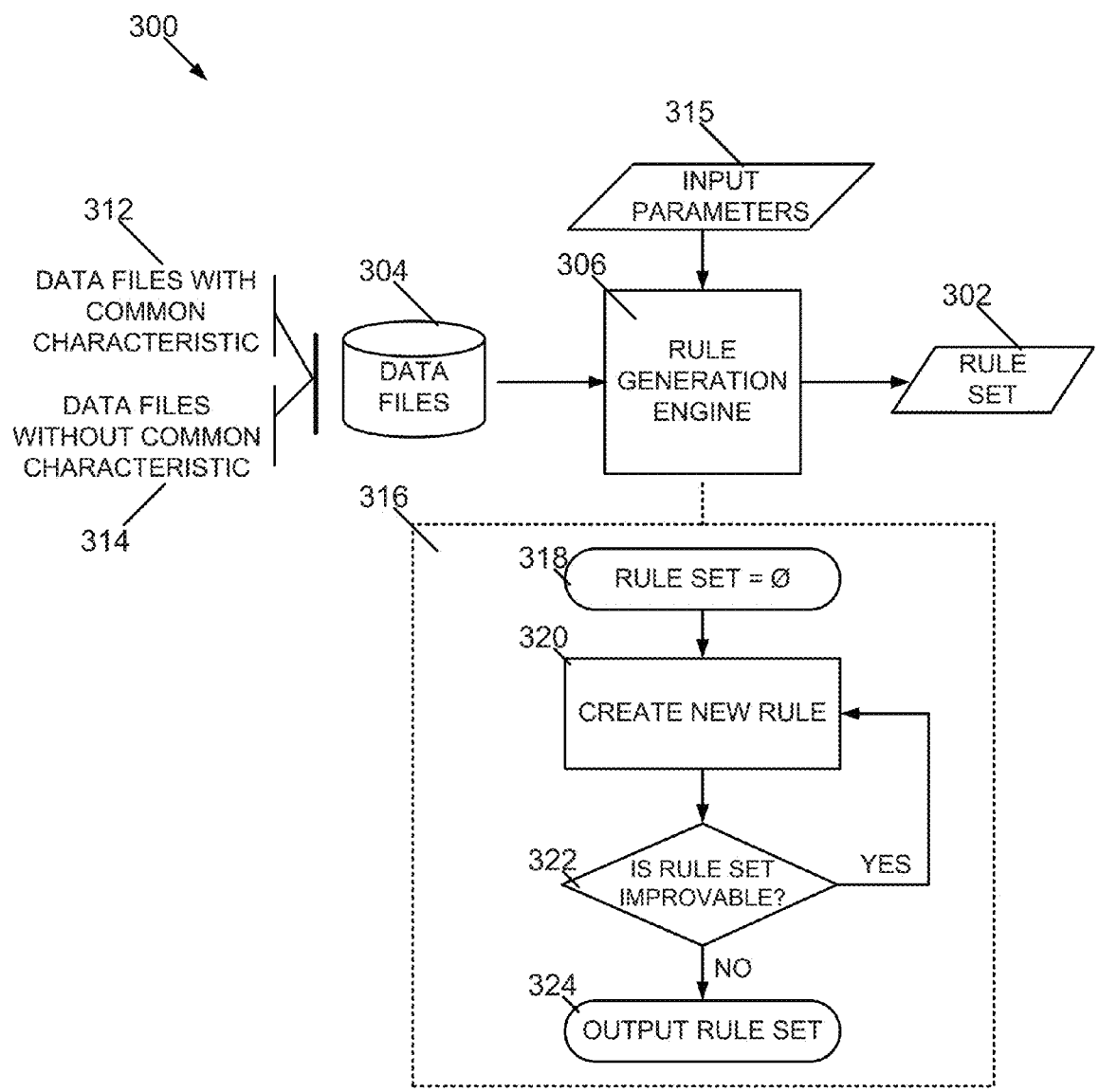
FIG. 3 is a block diagram of an example system for generating a rule set from a plurality of labeled data files.

FIG. 3 is a block diagram of an example system 300 for generating a rule set 302 from a plurality of labeled data files 304. In FIG. 3, the data files 304 may have been labeled by humans or a computer as relating to one or more categories and are used as training data for a rule generation engine 306. The data files 304 may include documents of various types (e.g., text documents, documents containing financial data, documents containing medical data). The labels applied to the data files 304 (e.g., by a human or a computer) identify certain data files as having a common characteristic 312 (i.e., they would be classified under a common category) and certain data files as not having the common characteristic 314. The common characteristic may vary across different document types. As illustrated in the example of FIG. 2, the common characteristic may be a particular subject matter for textual documents (i.e., all of the textual documents have a common theme or focus on a particular topic). In another example where the data files 304 relate to financial information, the common characteristic may be an indication that a particular person is likely to default on a loan. Further, the common characteristic of the pre-labeled data files 304 may be defined broadly or narrowly. For example, the common characteristic can be that a document relates to sports, generally, or alternatively, the common characteristic can be that a document relates to a particular sporting event or to a particular athlete.

The labeled data files 304 and input parameters 315 may be received by the rule generation engine 306 and analyzed to generate the rule set 302. In particular, the rule generation engine 306 may perform steps 316 to generate the rule set 302. The steps 316 may include an iterative process whereby the rule set 302 is generated by adding rules one rule at a time until a stopping criterion is met. At 318, the steps 316 begin with a null rule set containing no rules. At 320, a new rule is created and added to the null rule set. As described in further detail below, the rules may be created based on the labeled data files 304 functioning as training data, such that the rule generation engine learns rules by analyzing features of the data files having the common characteristic 312 and not having the common characteristic 314. At 322, the stopping criterion is evaluated, where a determination is made as to whether the rule set is improvable. The evaluation of the stopping criterion 322 occurs after the addition of each and every rule in the iterative process 316. The stopping criterion determination 322 may be based, for example, on a precision and a recall of the rule set (e.g., an F1 score that is a harmonic mean of the precision and recall of the rule set) and whether adding an additional rule could improve the rule set when evaluating it under these measures.

If the rule set is improvable, another rule is created and added to the rule set at 320. As illustrated in the example of FIG. 2, the rule set 302 may be of a disjunctive normal form (DNF). The disjunctive normal form causes rules added to the rule set 302 to be linked by "OR" operators and the selected key terms of each rule to be linked by "AND" operators. The iterative process of adding rules to the rule set 320 one rule at a time and checking the stopping criterion 322 continues until the rule set is not improvable, such that at 324, the rule set 302 is output. As described in further detail below, the iterative process steps 318, 320, 322, 324 may utilize the input parameters 315 and data files 304 received by the rule generation engine 306 in creating and evaluating potential rules for the rule set 302. In particular, distinctions between the data files labeled as possessing the common characteristic 312 and those labeled as not possessing the common characteristic 314 are analyzed to determine if a potential rule satisfies a rule evaluation metric. The rule evaluation metric may determine a relevancy of the potential rule to the data files labeled as possessing the common characteristic 312. Input parameters 315 may be used, for example, to determine if the relevancy of the potential rule to the data files labeled as possessing the common characteristic 312 meets a baseline amount of relevancy required by the rule evaluation metric.

Figure 4:
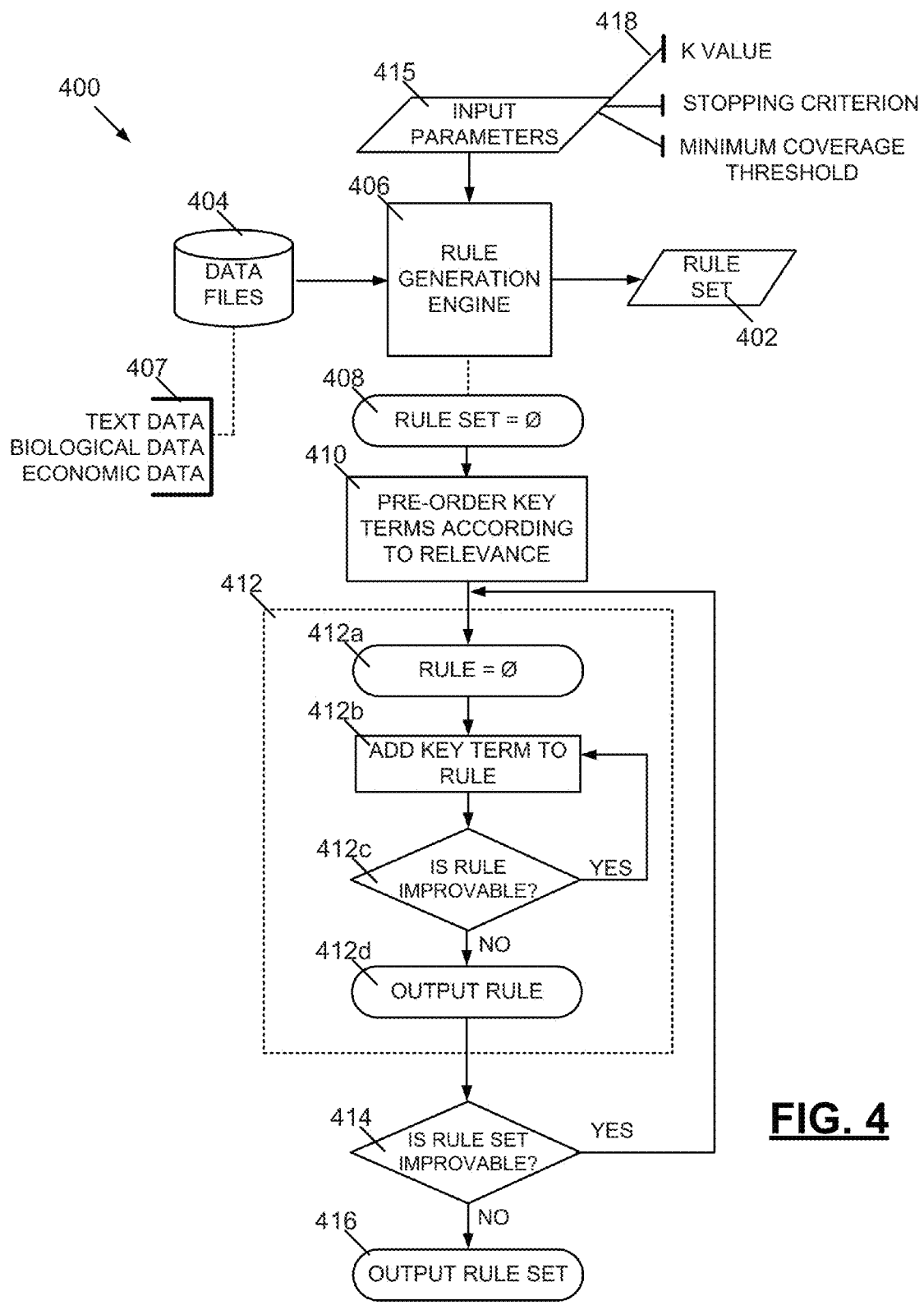
FIG. 4 is a block diagram of another example system for generating a rule set from a plurality of labeled data files.

FIG. 4 is a block diagram of another example system 400 for generating a rule set 402 from a plurality of labeled data files 404. Similar to FIG. 3, the labeled data files 404 are used as training data for a rule generation engine 406, with certain of the data files 404 being labeled as relating to a particular common characteristic (i.e., category) and certain of the data files being labeled as not relating to the particular common characteristic. As in the example system of FIG. 3, the rule generation engine 406 uses the labels to identify features (i.e., words, numbers, purchases, patterns, genes, medical data) indicating that a particular data file is related to the common characteristic.

The labeled data files 404 of FIG. 4 may be of different types and may include, for example, text data, biological data, and/or economic data 407. The particular type of data included in the data files 404 affects the function that the rule set 402 is configured to perform. For example, if the data files 404 include text documents (i.e., articles, webpages), the rule set may be configured to perform a text categorization function and/or to generate search strings for a search engine, as illustrated in FIGS. 1A and 1B. If the data files 404 include biological data, the rule set 402 may be configured to make a determination as to whether an individual is likely to develop a particular medical condition. When the data files 404 include such biological data, rules in the rule set 402 may include DNA data, RNA data, or genomic data. If the data files 404 include economic data, the rule set 402 may be configured to make a determination as to whether an individual is likely to purchase an item or default on a loan. When the data files 404 include such economic data, the rules included in the rule set 402 may include purchasing data, stock market data, financial data, loan data, or credit history data. The data files 404 may be data encoded in a sparse format. Thus, aside from the text data, biological data, and economic data 407 illustrated in FIG. 4, the data files 404 may include other types of sparse data.

Using the labeled data files 404 as input, the rule generation engine 406 may perform steps 408 through 416 to generate the rule set 402. The steps 408 through 416 include two main processes, one being a rule set generation process and the other being a rule generation process 412. Both of the main processes may be iterative processes, and the rule generation process 412 may be a nested, inner process that occurs within an iteration of the outer, rule set generation process. In the rule set generation process, rules are generated one rule at a time, and after a generated rule has been added to the rule set 402, a first stopping criterion is evaluated to determine if rule generation steps should be repeated to add another rule to the rule set 402. Similarly, the rule generation process is used to join terms together to generate a single rule, and this process may involve adding terms to the rule one term at a time and evaluating a second stopping criterion to determine if further terms should be added to the rule.

At 408, the rule set generation process begins with a null rule set containing no rules. At 410, prior to generating a rule, a set of key terms are ordered based on each key term's relevance to a particular common characteristic (i.e., category, classification). The key terms may be words, phrases, numbers, amounts of money, or genes, for example, and may have been extracted from the labeled data files 404 or generated from other, external sources. From the ordered list of key terms, key terms are selected and included as constituent parts of a rule. The ordering based on relevance performed in the step 410 is used such that when generating a rule, the most promising terms may be evaluated first.

At 412, steps of the rule generation process are used to generate a single rule. The rule generated as a result of the rule generation steps 412 may be added to the rule set 402 if it satisfies a particular rule evaluation metric. If the generated rule satisfies the rule evaluation metric and is added to the rule set 402, at 414, a determination is made as to whether the rule set 402 is improvable (i.e., whether adding another rule to the rule set 402 could potentially increase a performance of the rule set). If the rule set 402 is determined to be improvable, the steps 412 of the rule generation procedure are performed again to add another rule to the rule set 402. In this way, the rule generation process is an iterative process, where rules are added one at a time to the rule set 402, and the process is repeated only if a stopping condition is not met. If the rule set is determined to be not improvable (i.e., the stopping condition is met), at 416, the rule set 402 is output.

The steps 412 of the rule generation process, which are used to generate a single rule to be potentially added to the rule set 402, also include an iterative process. The iterative process of the rule generation steps 412 form a nested, iterative process within the outer steps of the iterative rule set generation process. At 412a, the rule generation process begins with a null rule containing no terms. At 412b, a key term from the ordered list of key terms is added to the null rule. As described in further detail below with respect to FIG. 6, the key term is added to the rule only if it satisfies a term evaluation metric. At 412c, after adding the key term to the rule, a determination is made as to whether the rule is improvable (i.e., whether adding additional key terms could potentially improve a performance of the rule). If the rule is improvable, another key term is added to the rule at 412b. If the rule is not improvable, at 412d, the rule is output. As noted above with respect to the rule set generation steps, the generated rule is added to the rule set 402 only if it satisfies the rule evaluation metric.

One or more input parameters 415 received by the rule generation engine 406 may affect the execution of the rule set generation steps and the rule generation steps. The input parameters 415 may include, for example, a "k" value, a stopping criterion, and/or a minimum coverage threshold 418. The k value may be used to implement a "k-best" search strategy for adding rules to a rule set and for adding terms to a rule. As described in greater detail below with respect to FIGS. 5 and 6, a rule or term may be included in a rule set only if it is better than a predetermined number of other rules or terms, respectively. Thus, the variable k included in the input parameters may be used to specify this predetermined number of other rules or terms. The stopping criterion value of the input parameters 415 may define under what conditions the iterative rule set and rule generation processes are to be exited. For example, for the rule set generation process, the stopping criterion may specify that if a performance of the rule set would not improve by at least a particular amount by adding another rule, then further rules should not be added to the rule set, and the iterative rule set generation process should be exited. The minimum coverage threshold variable of the input parameters 415 may be used to ensure that a rule to be added to the rule set 402 covers a predetermined number of data files. By requiring that the minimum coverage threshold is met, overfitting and overly-specific rules that do not generalize well to different data files may be avoided.

Other input parameters 415 that may be used in the system 400 include an m-estimate value and a maximum p-value parameter. The m-estimate value is used to estimate how much a distribution of a term changes between training and test data. This value is used to adjust for selection bias by punishing long rules (i.e., rules with many terms included) and rules that contain terms that occur rarely and that may not generalize well to data from different sources. The m-estimate value is thus used to handle noise in input data and to avoid overfitting of the input data by taking into account an applicability of a potential rule to data not included in the input data. The maximum p-value parameter is a maximum p-value for considering a term as a rule or for adding a term to an existing rule, where the p-value refers to a probability that a term is not relevant in determining whether a document should be identified as having a common characteristic. In some examples, the maximum p-value parameter has a value of between 0.01 to 0.000001.

Figure 5:
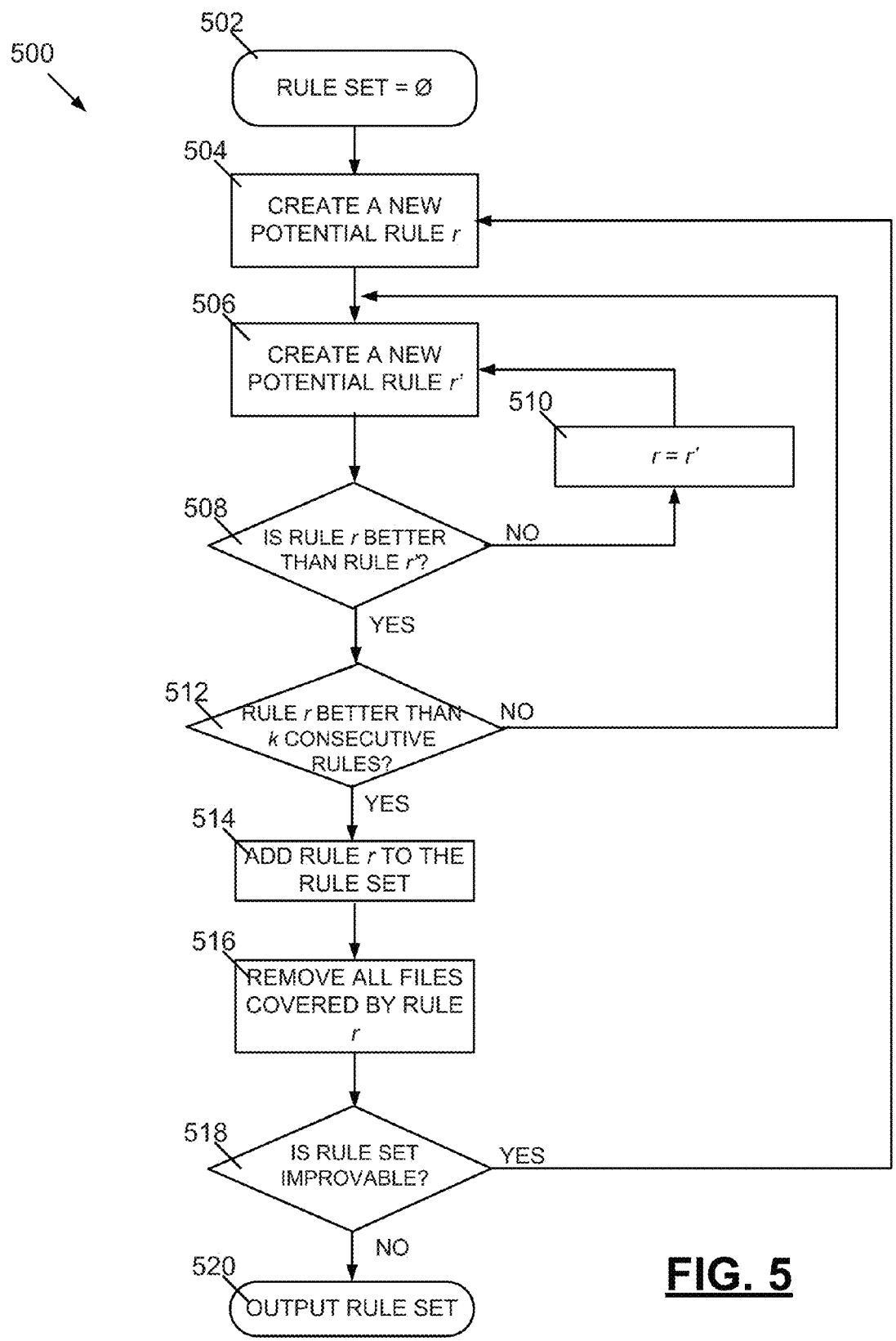
FIG. 5 is a flowchart depicting example steps of a rule set generation process used to generate a rule set.

FIG. 5 is a flowchart depicting example steps of a rule set generation process 500 used to generate a rule set. The rule set generation steps define an iterative process, where rules are generated and added to the rule set one at a time, and the rule generation steps are thereafter repeated only if a stopping criterion is not met. As described in further detail below, the rule set generation process is based on a k-best search scheme, where a particular rule is added to the rule set only if it is better than k consecutive rules generated after the generation of the particular rule.

The rule set generation process of FIG. 5 begins at 502 with a null rule set containing no rules. At 504, a potential rule r is generated, and at 506, a potential rule r' is generated. Potential rules r and r' may be generated, for example, using the rule generation process described below with respect to FIG. 6. Potential rules r and r' may each be added to the rule set if they each satisfy a rule evaluation metric. The rule evaluation metric may be used to evaluate a relevancy of the potential rules r and r' to a set of training data containing one or more data files having a common characteristic and one or more data files not having the common characteristic.

Steps of the rule evaluation metric begin at 508, where a determination is made as to whether rule r is better than rule r'. Rule r is better than rule r' if rule r has a higher rule relevancy to the one or more data files having the common characteristic. The rule relevancy of the potential rule may be based on a precision and a recall of a rule set including the potential rule. The precision of a rule set may be defined according to:

$$\text{Precision} = tp/(tp+fp),$$

where tp is a true positive and fp is a false positive produced by the rule when being evaluated using training data. Thus, generally, the precision refers to the fraction of training data documents classified by a rule that have been classified correctly. The recall of a rule set may be defined according to:

$$\text{Recall} = tp/(tp+fn),$$

where fn is a false negative produced by the rule when being evaluated using training data, and tp is defined as above. Recall thus refers to the fraction of relevant training data documents that were identified by the rule.

In one example, the rule relevancy of a potential rule is based on an F1 score, where the F1 score is a harmonic mean of the precision and the recall and may be defined according to:

$$F1 = 2 \cdot (\text{precision} \cdot \text{recall})/(\text{precision} + \text{recall}).$$

In this example, rule r is better than rule r' only if rule r has a higher F1 score than rule r'.

If rule r is determined at 508 to not be better than rule r', at 510, variable r is set equal to variable r', and a new potential rule r' is generated at 506. In this manner, because rule r was determined to not be better than rule r', original rule r is effectively removed from further consideration for inclusion in the rule set. Original rule r' (now labeled as rule r after step 510) is then evaluated under the steps of the rule evaluation metric, beginning at 508 with its comparison to the new potential rule r'.

If potential rule r is determined to be better than potential rule r', at 512, a determination is made as to whether potential rule r is better than k consecutive potential rules that were generated subsequent to the generation of rule r. Step 512 thus implements a "k-best" search strategy, where the potential rule r will be added to the rule set only if it is better than k consecutive rules generated after the generation of the potential rule r. The k-best determination as to whether potential rule r is better than k consecutive rules may be based on the F1 score described above, where the F1 score is a harmonic mean of the precision and the recall of the rule set. If the potential rule r has not been compared to and determined to be better than k consecutive rules generated subsequent to its generation, the process returns to step 506, where a new potential rule r' is generated and subsequently compared to potential rule r at 508.

After potential rule r has been compared to and determined to be better than k consecutive rules at 512, potential rule r is added to the rule set at 514. At 516, after adding the rule r to the rule set, all of the files of the training data files that are covered by the potential rule r are removed from the set of training data files. Files covered by potential rule r may include those files that would be identified as possessing the common characteristic by the rule r, as well as those that would be affirmatively identified as not possessing the common characteristic by the rule r.

After adding the rule r to the rule set and removing data files covered by the rule r, at 518, a determination is made as to whether the rule set is improvable. This determination may function as a stopping criterion for the rule set generation process, such that subsequent rules are added to the rule set only if the stopping criterion is not met. The determination 518 as to whether the rule set is improvable may be based on the rule set's F1 score. In one example, the rule set may be determined to be not improvable when adding another rule cannot produce a statistically significant improvement in the rule set's F1 score. The stopping criterion may be adjusted based on a precision required by an application or based on other characteristics of the application. If the rule set is determined to be improvable, a new potential rule r is generated at 504, and the steps of the rule evaluation process are repeated. If the rule set is determined to not be improvable, the rule set is output at 520.

In some examples, the stopping criterion is based on an adjusted F1 score, where the adjusted F1 score is the harmonic mean of adjusted precision and adjusted recall. The adjusted precision value is defined according to the following equation:

$$\text{Adjusted\_precision} = (tp + m\_\text{estimate} * cat\_\text{frequency})/(tp + fp + m\_\text{estimate}),$$

where the m-estimate value estimates how much a distribution of a term changes between training and test data and cat_frequency is the sample occurrence of a category under consideration. The adjusted recall value is defined according to the following equation:

Adjusted_recall=(tp+m estimate*cat_frequency)/(tp+ fn+m_estimate).

The adjusted F1 score is defined according to the following equation:

F1_adj=2·(adjusted_precision·adjusted_recall)/(adjusted_precision+adjusted_recall).

When the stopping criterion is based on the adjusted F1 score, the rule set is determined to be not improvable when adding another rule cannot produce an improvement in the rule set's F1_adj score.

Figure 6:
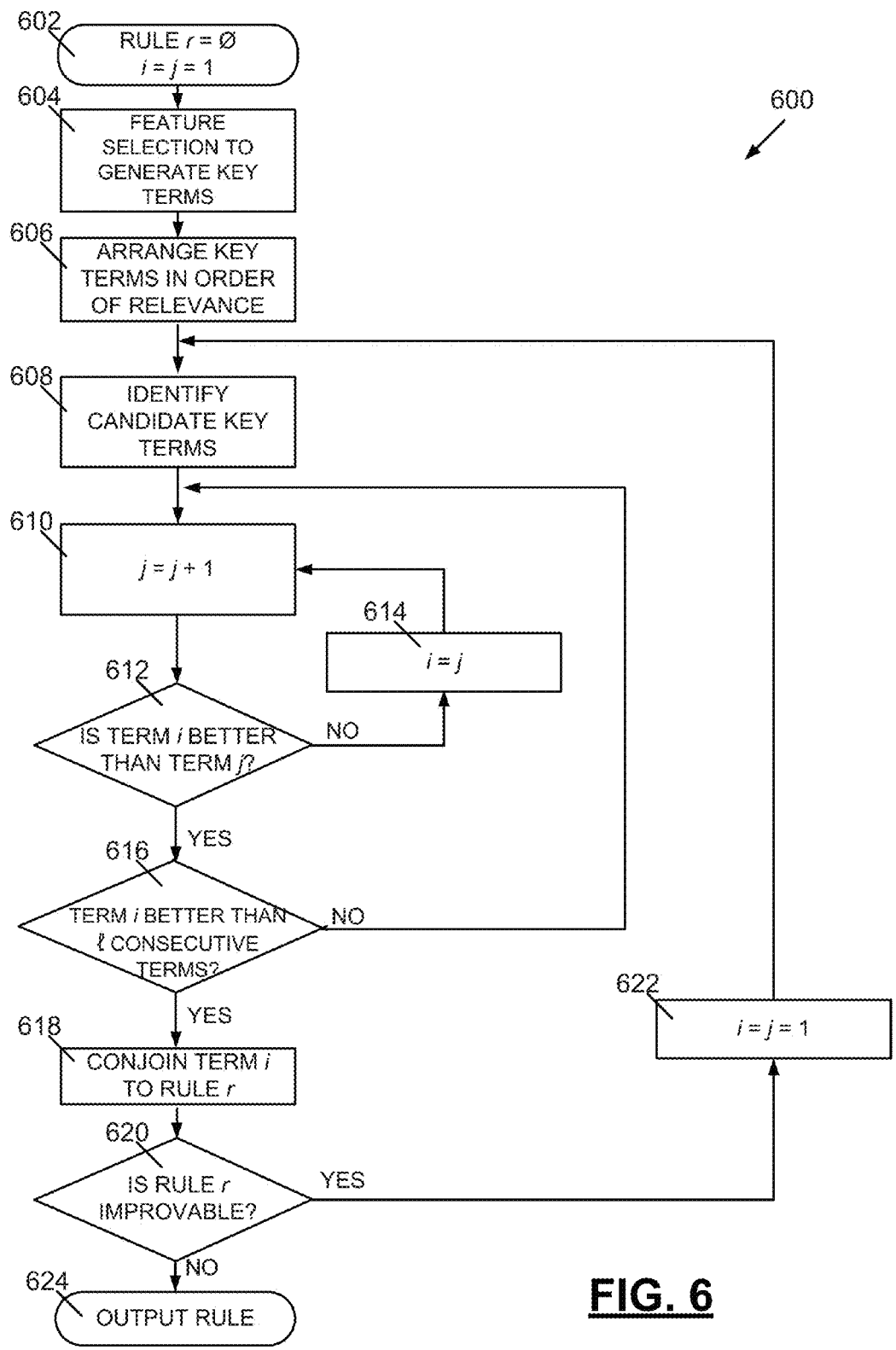
FIG. 6 is a flowchart depicting example steps of a rule generation process used to generate a potential rule for inclusion in a rule set.

FIG. 6 is a flowchart depicting example steps of a rule generation process 600 used to generate a potential rule for inclusion in a rule set. With reference to FIG. 5, steps 504 and 506 require the generation of potential rules r and r', respectively. These rule generation steps 504, 506 may each utilize steps 602 through 624 of FIG. 6, which together define an iterative rule generation process. Thus, the iterative rule generation steps 602 through 624 of FIG. 6 may function as a nested inner loop of the iterative rule set generation process illustrated in FIG. 5.

The rule generation process 600 of FIG. 6 begins at 602 with a null rule including no terms. At 602, variables i and j, used throughout the steps of FIG. 6, are both set equal to one. At 604, a feature selection step is performed in order to generate key terms to be included in rules. A rule includes one or more key terms, where each of the key terms of the rule is linked by "AND" operators. Thus, to generate rules, key terms that can potentially be included in the rules are first generated. In one example, the feature selection step 604 may be performed by extracting all words, numbers, symbols, and/or other data pieces from the training data files (e.g., data files 304 of FIG. 3, data files 404 of FIG. 4). For example, when the training data files used for generating the rule set consist of English-language text, the feature selection step 604 may simply extract and isolate all words from the training data files, such that each word may thereafter be a key term that could potentially be added to a rule.

At 606, the generated key terms are ordered based on each term's relevance to a particular common characteristic of the training data files (i.e., a category or classification). In one example, a key term's relevance to the common characteristic may be based on an information gain or g-score metric. Information gain may be defined according to:

$$\text{Gain}(r_{i+1}, r_i) = T_{i+1}^+ \cdot \left( -\log_2 \frac{T_i^+}{T_i^+ + T_i^-} + \log_2 \frac{T_{i+1}^+}{T_{i+1}^+ + T_{i+1}^-} \right),$$

where $T_i^+$ is the number of positive examples of the training data files covered by the list with the addition of a particular key term to the list, and $T_i^-$ is the number of negative examples of the training data files covered by the list with the addition of the particular key term to the list. The g-score is a likelihood ratio statistic that may be defined according to:

$$G = 2 \sum_i O_i \log\left(\frac{O_i}{E_i}\right),$$

where $O_i$ is a number of observed examples of the training data files covered by the list, and $E_i$ is a number of expected examples of the training data files covered by the list. Terms that have a higher information gain or g-score with respect to the common characteristic may be determined as being of higher relevance to the common characteristic and may be ordered higher within the list. Pre-ordering key terms in this manner may ensure that the most promising terms are evaluated first and help to avoid missing suitable terms for a rule. At 608, candidate key terms are identified from the list. This step may be used to identify a starting place within the list. For example, upon an initial iteration of the steps of FIG. 6, the candidate terms will be those terms ordered highest within the list. However, upon subsequent iterations, with the terms ordered highest within the list previously evaluated, the candidate terms to be evaluated in a particular iteration may be found lower in the list.

To begin the rule generation process, at 610, variable j is incremented by 1. Variables i and j in FIG. 6 may be index numbers that refer to particular positions within the list of key terms. Thus, following step 610, with variable i equal to 1, and variable j equal to 2, term i may refer to a term at position 1 in the list (i.e., the term determined to be most relevant to the category or classification based on information gain or g-score), and term j may refer to a term at position 2 in the list. Terms i and j may each be part of a generated rule if they each satisfy a term evaluation metric. The term evaluation metric is used to evaluate a relevancy of the terms i and j to a set of training data containing one or more data files having a common characteristic and one or more data files not having the common characteristic.

At 612, a determination is made as to whether term i is better than term j. Term i is better than term j if term i has a higher term relevancy to the one or more data files having the common characteristic. Term relevancy may be based on one or more criteria. In one example, the term relevancy is based on a combined criteria, where a first term is better than a second term if (1) the addition of the first term to the rule results in a rule with a statistically significant higher g-score than a rule created by adding the second term, (2) the addition of the first term to the rule results in a rule that meets a minimal coverage requirement, and (3) the addition of the first term to the rule results in a rule with a higher precision than a rule created by adding the second term. In another example, the term relevancy of a particular term is based on a precision or purity of a rule including the potential term, where the purity of the rule is a measure derived from the precision of the rule that is based on a presumed error measure in the precision.

If term i is determined at 612 to not be better than term j, at 614, variable i is set equal to variable j, and j is again incremented by a value of 1 at 610. Thus, because term i was determined to not be better than term j, original term i is effectively removed from further consideration for inclusion in the rule. Original term j (now labeled as term i after step 614) is then evaluated under the steps of the term evaluation metric, beginning at 612 with its comparison to the new term j.

If term i is determined at 612 to be better than term j, at 616, a determination is made as to whether term i is better than l consecutive terms in the ordered list. Similar to the "k-best" search strategy used in the rule set generation process of FIG. 5, the rule generation process of FIG. 6 utilizes an "l-best" search strategy, where the term i will be conjoined to the rule r only if it is better than l consecutive terms following it in the ordered list. The l-best determination as to whether term i is better than l consecutive terms may be based on the same measures described above with respect to step 612. If the potential term i has not been compared to and determined to better than l consecutive terms following it in the list, the process returns to step 610, where variable j is incremented and the new term j is subsequently compared to term i at 612. The l-best search strategy may be used to reduce the size of the search space and to disallow term addition that does not provide a statistically significant improvement in the rule.

Aside from the l-best search strategy criterion for adding rules, further rule criteria may be applied. For example, an "m-estimate" criterion may be used to adjust for selection bias by punishing long rules (i.e., rules with many terms included) and rules that contain terms that occur rarely and that may not generalize well to data from different sources. The m-estimate criterion accomplishes this by estimating how much a distribution of a term changes between training and test data and by adjusting the calculated precision value based on this determination. The m-estimate value is thus used to handle noise in input data and to avoid overfitting of the input data by taking into account an applicability of a potential rule to data not included in the input data. An adjusted precision value, calculated using the m-estimate value, is defined according to the following equation:

$$\text{Adjusted\_precision} = (tp + m\_\text{estimate} * cat\_\text{frequency}) / (tp + fp + m\_\text{estimate}),$$

where tp is a number of items correctly categorized by a rule (i.e., true positive), fp is a number of items incorrectly categorized by the rule (i.e., false positive), and cat_frequency is a sample occurrence for a category under consideration. The m-estimate value is generally an integer of 1 or greater, and in some examples, an m-estimate value of between 2 and 32 is used.

Additionally, a minimal positive document coverage criterion may be applied to a rule before adding it to the rule set. This criterion may require a rule to cover at least a predefined number of positive documents, which may help to avoid generating over-specific rules. This criterion may also effectively shorten the search path and improve generalization of the created rules.

After term i has been compared to and determined to be better than t consecutive terms following it in the ordered list at 616, term i is conjoined to the rule r at 618. At 620, after adding the term i to the rule, a determination is made as to whether the rule r is improvable. The determination 620 of whether the rule r is improvable is a second stopping criterion that is met when selecting another potential term for inclusion in the rule r cannot improve a purity or precision of the potential rule. If the rule r is determined to be improvable, at 622, the variables i and j are set equal to one and the process returns to step 608, where a new set of candidate terms are identified, such that another term can be added to the rule r. If rule r is determined to not be improvable, at 624, rule r is output.

As noted above, the example rule generation steps of FIG. 6 may be used as a nested, inner loop within the example iterative rule set generation process of FIG. 5. Thus, after a rule has been generated pursuant to the steps of FIG. 6, it may thereafter be evaluated under the rule evaluation metric of FIG. 5 (i.e., determinations 508, 512) and added to the rule set if the rule evaluation metric is satisfied.

FIG. 7 is a table 700 depicting a generation of a rule set by adding rules one at a time to the rule set. In the table 700 of FIG. 7, each row includes a rule 702, a precision value 704 for the rule set, a recall value 706 for the rule set, and an F1 value 708 for the rule set. Each row of the table 700 represents an addition of the rule 702 to the rule set and the effect that the addition of the rule 702 has on the precision 704, recall 706, and F1 value 708 of the rule set. Pursuant to the example rule set generation steps of FIG. 5, rules 702 that satisfy a rule evaluation metric are added to the rule set one at a time, and a stopping criterion is evaluated after the addition of each rule 702 to determine if the rule set is improvable. In the example of FIG. 7, as each rule 702 is added to the rule set, the precision 704 of the rule set decreases, the recall 706 of the rule set increases, and the F1 score 708 of the rule set increases.

FIG. 8 is a table 800 depicting a number of potential rules 802 for a rule set and a selection 803 of a particular potential rule 804 for the rule set. As discussed above with respect to FIG. 5, a potential rule may be added to the rule set if it satisfies a "k-best" rule evaluation metric, which requires that the particular rule to be added to the rule set be better than k consecutive rules generated subsequent to the generation of the particular rule. The determination of whether the particular rule is better than the k consecutive rules may be based on an F1 score of the rule set including the particular rule, such that the addition of the particular rule cause the rule set to have a higher F1 score than the addition of any of the other k consecutive rules.

The selection 803 of the particular potential rule 804 in FIG. 8 illustrates these concepts. In FIG. 8, the particular potential rule 804 is added to the rule set because, as versus the other potential rules 802, the addition of the particular potential rule 804 improves the F1 score 806 of the rule set the most. Thus, the particular potential rule 804 of FIG. 8 may have satisfied the k-best search strategy, enabling it to be added to the rule set.

FIG. 9 is a table 900 depicting an addition of terms 901 to a rule and a satisfaction of a stopping criterion 902 to discontinue the addition of further terms. As illustrated above with respect to FIG. 6, terms may be conjoined to a rule if they satisfy an "l-best" search strategy, which may require a term to be better than l consecutive terms of an ordered list of key terms. A term may be better than another term if it has a higher term relevancy to one or more data files having a common characteristic, where the term relevancy may be based on a purity or precision of a potential rule including the term. Thus, under such a process, terms are conjoined to the rule one at a time, and after addition of each term, a stopping criterion is evaluated to determine whether the rule could be improved with the addition of another term.

FIG. 9 illustrates the above concepts. In FIG. 9, a first row 904 represents a rule including one term. Subsequent rows 906, 908, 910, 912 illustrate the conjoining of terms to the rule, one term at a time. With the addition of each term, the precision 912 of the rule may increase. After each term is added, the stopping criterion 902 is evaluated. As illustrated in FIG. 9, the stopping criterion may be based on whether the rule can be improved by adding another term. After the addition of the rule of the bottom row 912, the stopping criterion 902 is satisfied because the rule cannot be improved by adding further terms.

Figure 10:
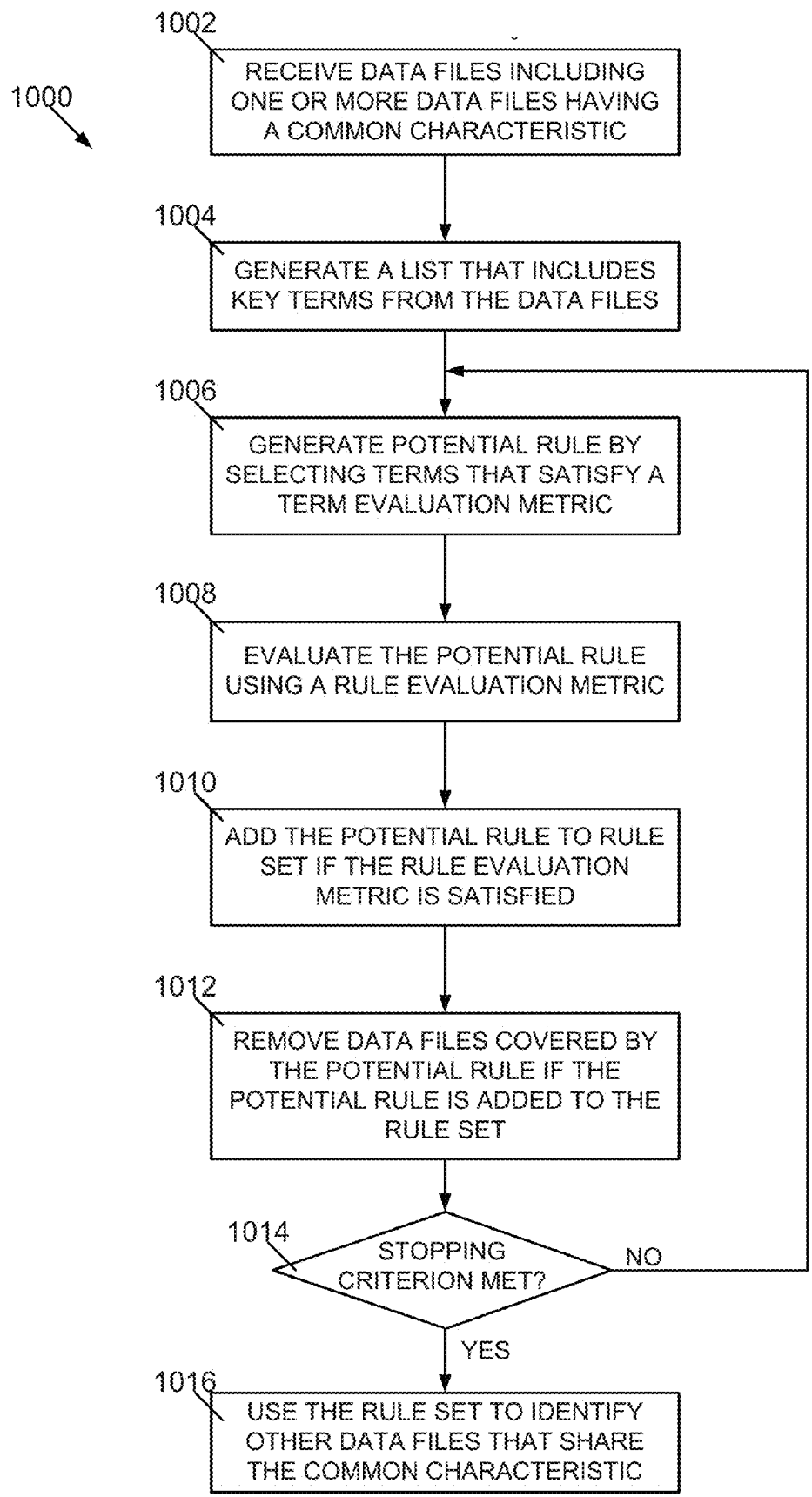
FIG. 10 is a flowchart illustrating an example method for identifying data files that have a common characteristic.

FIG. 10 is a flowchart illustrating an example method for identifying data files that have a common characteristic. At 1002, a plurality of data files are received, where the plurality of data files include one or more data files having a common characteristic. At 1004, a list including key terms from the plurality of data files is generated, and the list is used to generate the rule set. The rule set is generated according to steps 1006 through 1014. At 1006, a potential rule is generated by selecting one or more key terms from the list that satisfy a term evaluation metric. At 1008, the potential rule is evaluated using a rule evaluation metric that determines a relevancy of the potential rule to the one or more data files having the common characteristic. At 1010, the potential rule is added to the rule set if the rule evaluation metric is satisfied. At 1012, data files covered by the potential rule are removed from the plurality of data files if the potential rule is added to the rule set. At 1014, a stopping criterion is evaluated. If the stopping criterion is not met, steps 1006 through 1012 are repeated to add another rule to the rule set. If the stopping criterion is met, at 1016, the rule set is output and used to identify other data files that have the common characteristic.

Figure 11A:
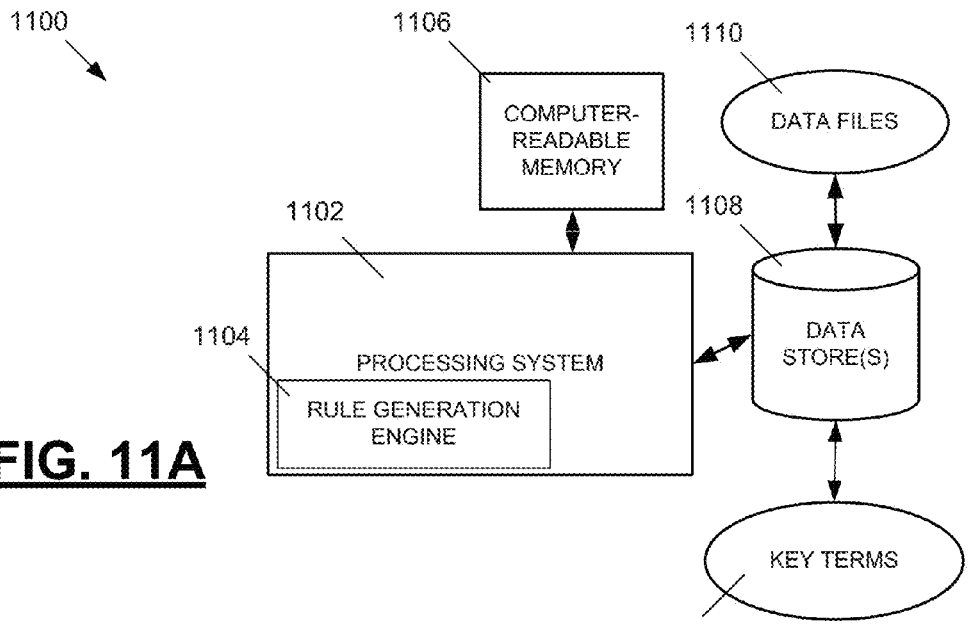
FIGS. 11A-D are block diagrams of example systems as described herein.
Figure 11B:
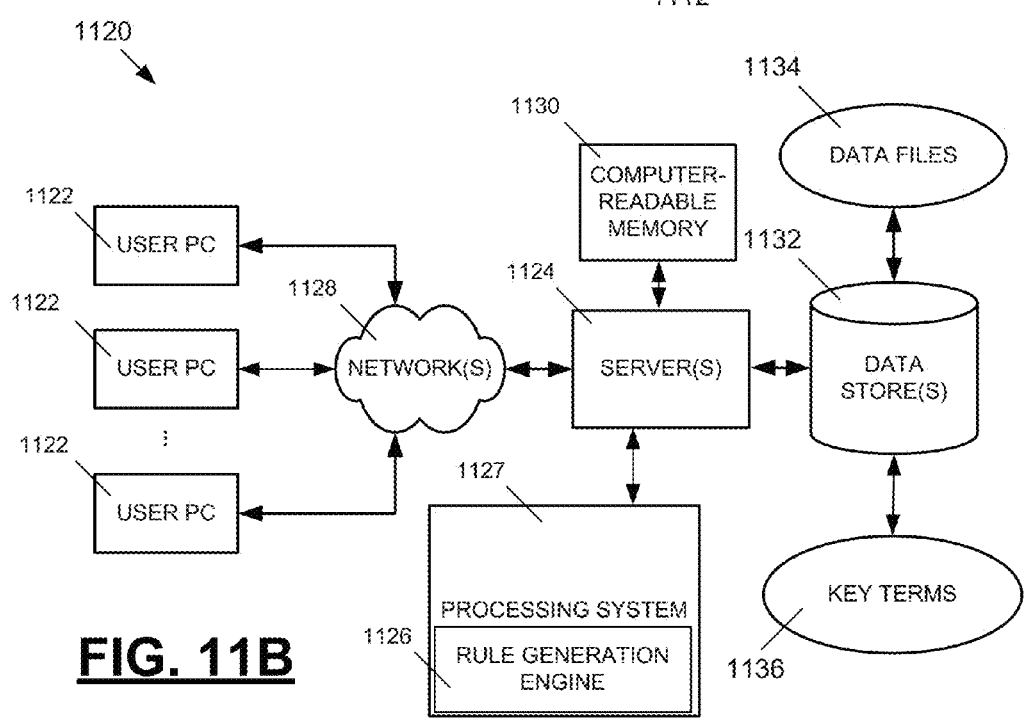
Figure 11C:
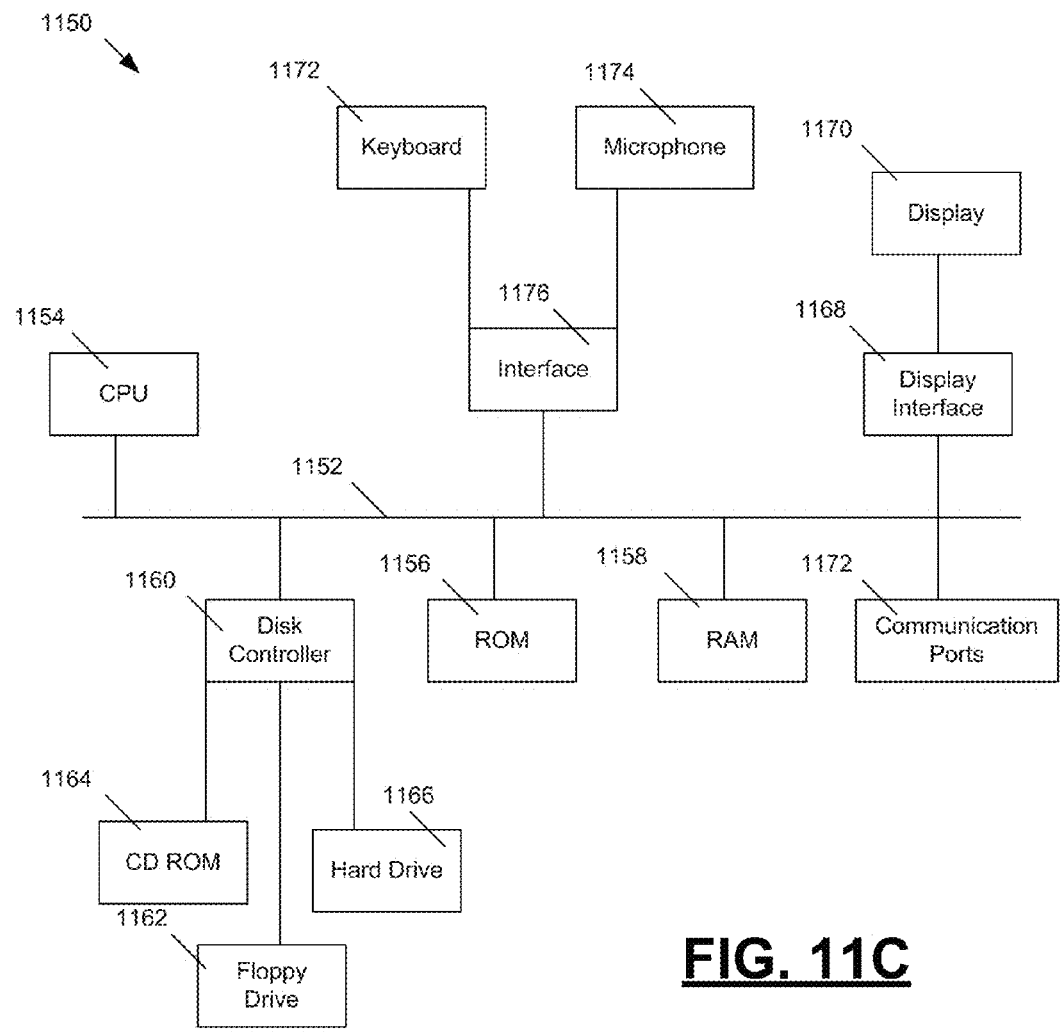

FIGS. 11A, 11B, and 11C depict example systems for use in implementing a rule generation system. For example, FIG. 11A depicts an exemplary system 1100 that includes a standalone computer architecture where a processing system 1102 (e.g., one or more computer processors located in a given computer or in multiple computers that may be separate and distinct from one another) includes a rule generation engine 1104 being executed on it. The processing system 1102 has access to a computer-readable memory 1106 in addition to one or more data stores 1158. The one or more data stores 1158 may include data files 1110 as well as key terms 1162. The processing system 1102 may be a distributed parallel computing environment, which may be used to handle very large-scale data sets.

FIG. 11B depicts a system 1120 that includes a client server architecture. One or more user PCs 1122 access one or more servers 1124 running a rule generation engine 1126 on a processing system 1127 via one or more networks 1128. The one or more servers 1124 may access a computer-readable memory 1130 as well as one or more data stores 1132. The one or more data stores 1132 may contain data files 1134 as well as key terms 1136.

FIG. 11C shows a block diagram of exemplary hardware for a standalone computer architecture 1150, such as the architecture depicted in FIG. 11A that may be used to contain and/or implement the program instructions of system embodiments of the present disclosure. A bus 1152 may serve as the information highway interconnecting the other illustrated components of the hardware. A processing system 1154 labeled CPU (central processing unit) (e.g., one or more computer processors at a given computer or at multiple computers), may perform calculations and logic operations required to execute a program. A non-transitory processor-readable storage medium, such as read only memory (ROM) 1156 and random access memory (RAM) 1158, may be in communication with the processing system 1154 and may contain one or more programming instructions for performing the method of generating a rule set. Optionally, program instructions may be stored on a non-transitory computer-readable storage medium such as a magnetic disk, optical disk, recordable memory device, flash memory, or other physical storage medium.

A disk controller 1160 interfaces one or more optional disk drives to the system bus 1152. These disk drives may be external or internal floppy disk drives, external or internal CD-ROM, CD-R, CD-RW or DVD drives such as 1164, or external or internal hard drives 1166. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1160, the ROM 1156 and/or the RAM 1158. Preferably, the processing system 1154 may access each component as required.

A display interface 1168 may permit information from the bus 1152 to be displayed on a display 1170 in audio, graphic, or alphanumeric format. Communication with external devices may optionally occur using various communication ports 1172.

In addition to these computer-type components, the hardware may also include data input devices, such as a keyboard 1173, or other input device 1174, such as a microphone, remote control, pointer, mouse and/or joystick.

Use of a Transaction Classification System to Identify k-Best Association Rules

A transaction classification system may use additional approaches to identify categorization rules, as well. From this point forward, this disclosure will describe and discuss these approaches. It is important to note that definitions, terminology, procedures described prior to this point in the document should not necessarily be used in interpreting the meaning of terminology used in the following paragraphs. In some cases, the following paragraphs will provide new or slightly varied definitions of terms used earlier in this document, and any such new or varied definitions should be understood as relevant from this point forward.

Association analysis has been used in a marketing context to identify products that are commonly purchased together as part of a single transaction. The problem of association rule mining is generally defined as: Let $I=\{i_1, i_2, \ldots, i_n\}$ be a set of n binary attributes called items. Let $D=\{t_1, t_2, \ldots, t_m\}$ be a set of transactions called the database. Each transaction in D has a unique transaction ID and contains a subset of the items in I. A rule is defined as an implication of the form $X \Rightarrow Y$ where $X, Y \subseteq I$ and $X \cap Y = \emptyset$. The sets of items (for short itemsets) X and Y are called antecedent (left-hand-side or LHS) and consequent (right-hand-side or RHS) of the rule respectively.

We will be extending this notion to include rules that contain absence of items as well as presence of items. Furthermore, we will deal with looking at situations where a single consequent has been identified, known as Classification Association Rules (or CAR), and where the consequent might be a category not represented by an item, but another way of classifying that transaction.

During a training phase, a transaction classification system (also referred to as a categorization system) can use a depth-first search guided by a best-first metaheuristic to efficiently identify a set of useful association rules that can be formed from amongst a large collection of word items. More specifically, the system can identify a set of association rules that are evaluated to be most useful for categorizing transactions based on words found in or omitted from those transactions. The system can perform a highly-effective suboptimal search for association rules within a large search space that encompasses any number of the various association rules that can be formed from the unique items found in a set of training transactions, without necessitating constraints on the number of rule terms. In such search situations, the search methodology and metaheuristics enable the system to quickly and efficiently identify rules that reveal a strong evaluation score when tested, and thus achieve significant computational savings over exhaustive search alternatives.

The system uses the search in a training phase to identify useful association rules with respect to a particular category. From this point forward, the term category shall be understood to refer to a group of transactions that are related in some identifiable way. The term transaction shall be understood to refer to any discrete unit of study or analysis. For example, in a text mining context, the term transaction may be used to refer to pages, documents, sentences, webpages, books, articles, or other such units. In the context of credit card fraud detection, the use of the word "transaction" may refer to events involving a credit card account such as card purchases, account inquiries, online account resets, account closures, account applications, or any other such event.

The term "item" will refer to a characteristic or feature that can be found amongst some, but not all, transactions. For example, when the term "transactions" refers to credit card purchases in the fraud detection context, a set of relevant items could be understood to include, amongst many other things, the various businesses at which the credit card purchases are made and/or each of the individuals in whose name a utilized account has been opened.

The techniques that will be disclosed in the following paragraphs may be applicable in many contexts. For example, they may be applied to detecting health risks based on associations between items that include genome sequences. They may also be applied to detect criminal activity or terrorist affiliations based on websites visited.

Prior to the search being conducted, the system identifies the most important discriminative items for category membership used in the training transactions. Generally, only items that show a statistically significant relationship with the category are retained for use in building rules, and they are ordered by descending strength of that relationship. The system then attempts to selectively and incrementally add additional items in a conjunctive relationship to the given rules. An item is added to a rule if the new potential rule satisfies two constraints: it satisfies an precision enhancement heuristic, the addition of the item provides a statistically significant improvement in information gain. Eventually, the only rules that are retained are those that have the highest estimated precision to categorize transactions.

Figure 11D:
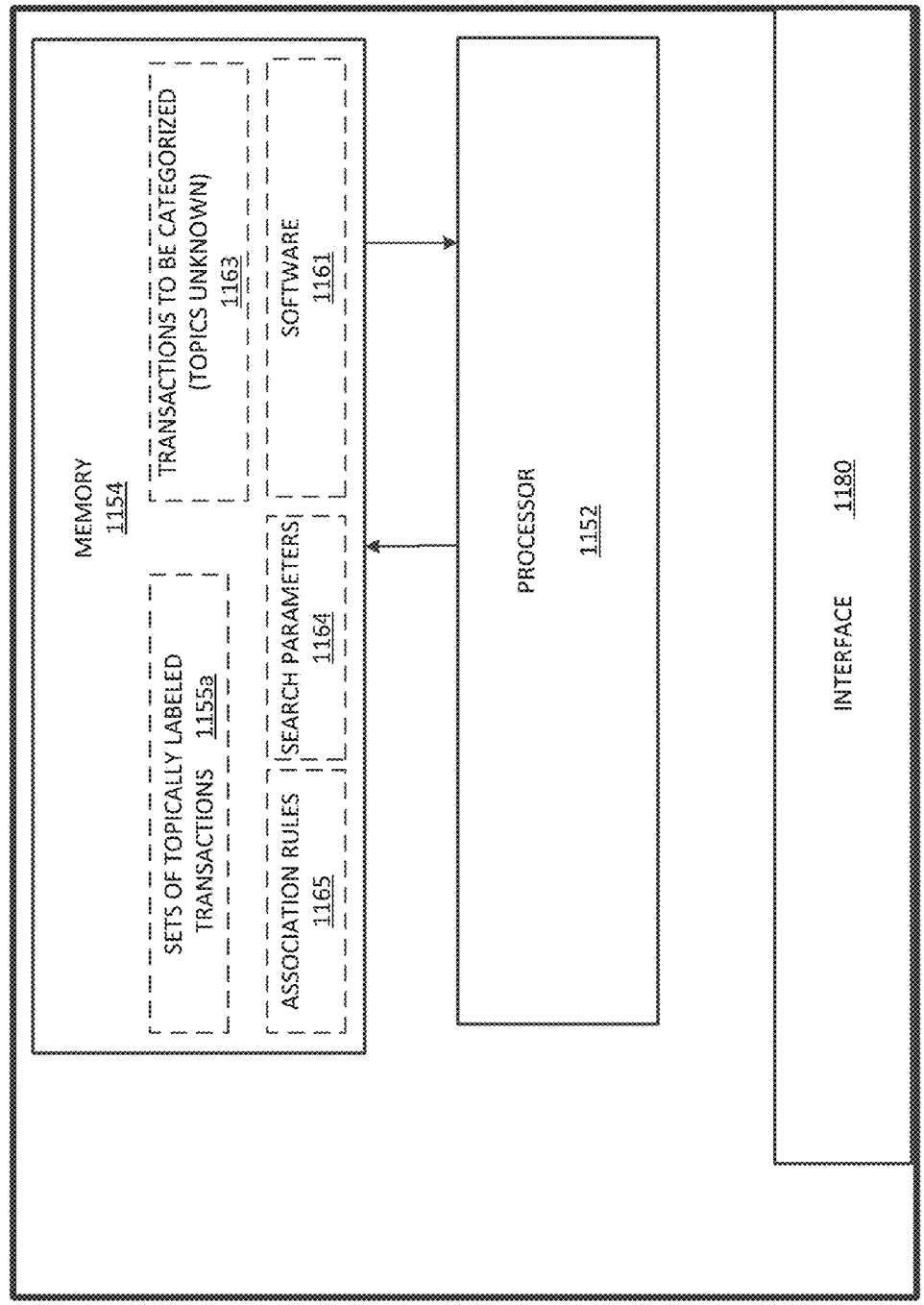

FIG. 11D is a block diagram of an example transaction classification system 1190. As depicted in FIG. 1, the transaction classification system 1190 includes a processor 1012 and a memory 1144. The memory 104 stores sets of training transactions 1155a and software 1161 that can be executed by the processor.

The training documents 1155a include categorization labels as will be described later. During training, the transaction classification system 1190 uses the training documents 1155a to evaluate the usefulness of individual association rules in the detection of a specific category and to identify a group of the rules that are most useful in this regard. Any rules so identified can then be stored in memory 1144 so that they may later be used to detect the category when new or uncategorized transactions 1163 are analyzed.

The software 1161 includes instructions that are written to cause the processor to derive and evaluate association rules using the techniques and methods described in this disclosure. The software 1161 also includes instructions for graphically displaying the association rules that are determined to be most useful. The system 1190 can use the graphical display interface 1180 to recommend that the user select these association rules for later use in detecting the category when they system 1190 classifies transactions 1163 or other transactions yet to be received by the system 1190.

A user can control the selection inputs to eliminate association rules that the user does not consider useful. This situation may occur when two distinct issues are referred to by the same term. For example, in identifying association rules for detecting the category golf (the sport) in a set of documents, the transaction classification system 1190 may include rules representing Golf as a Volkswagen sedan. The user would then not want to include those rules.

The selection inputs can be provided by the user at an interface 1180. When a user selects recommended association rules by providing selection inputs, the transaction classification system 1190 stores the rules 1165 in memory 1144. The rules 1165 can then be retrieved from memory 1144 to classify transactions with respect to the category at any time.

Figure 12:
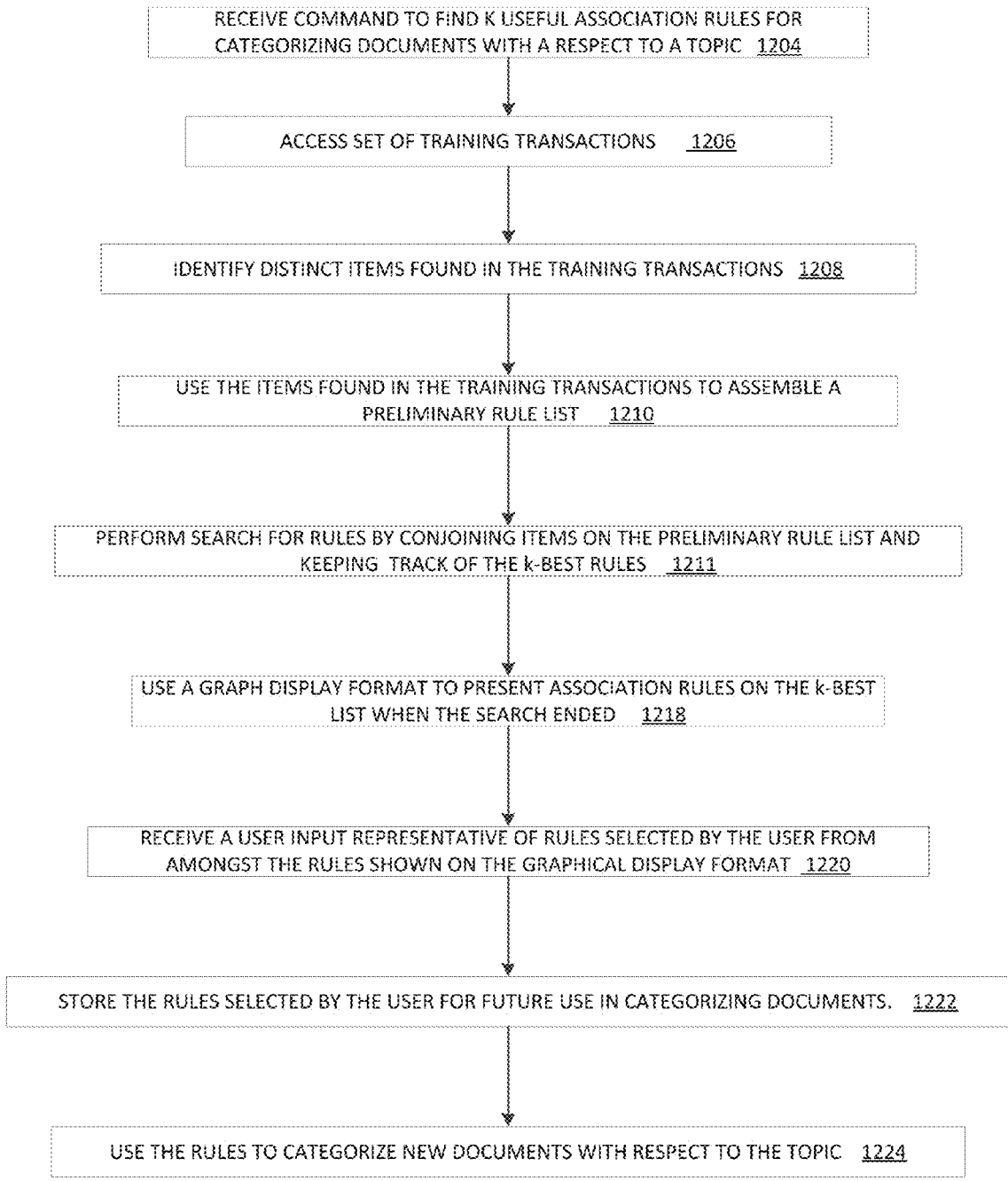
FIG. 12 is a flow diagram showing an example sequence of operations that may be executed by a transaction classification system as described herein.

FIG. 12 is flow diagram that presents a generalized overview of one possible mode of operation of the transaction classification system 1190. In paragraphs of this disclosure that follow the description of FIG. 12, the various processes and operations mentioned in the drawing will be described in greater detail.

As shown at 1204, the system 1190 can receive a command to find best k useful association rules for classifying transactions with respect to a category. At 1206, the system 1190 accesses a set of training transactions. At step 1208 it identifies all the distinct items used in the transactions, and evaluates their expected precision and information gain (evaluation not shown explicitly in FIG. 12). At 1210, the system 1190 uses those items to assemble a preliminary rule list.

At 1211, the system 1190 performs a search that involves conjoining terms on the preliminary rule list and keeping track of the k best rules found in the search.

After the search is completed, the system 1190 uses a graph display format to present the association rules and all the links leading to those rule that were on the k-best list when the search was finalized. This display operation is depicted at 1218. At 1220, the system 1190 receives an input representative of rules selected by the user from amongst the rule displayed at 1218. At 1222, the system 1190 stores these rules for feature use in classifying transactions with respect to the given category. At 1224, the system 1190 access the rules that were stored at 1222, and uses them to categorize new transactions.

Use of Training Documents and Evaluation of Association Rules

The system 1190 uses a large training set of transactions 1155a in which several categories are each addressed by at least a statistically significant number of transactions. Prior to being accessed, the categories of the transactions are obtained by one of the following means: 1) identification of an item that already occurs in the transactions, 2) a category based on some type of unstructured classification (for example, topic generation for documents), or 3) a category associated with the transaction itself which may be obtained based on information about the transaction, or perhaps by human reviewers. The transactions are labeled to indicate the resulting identifications.

When searching for useful rules for detecting a category, the system 100 compares classifications resulting from applying rules to the labeled categorizations. The system 1190 computes two different rule evaluation metrics that reflect these comparisons. The system 1190 uses the first one of the metrics heuristically in the process of making search decisions, and uses the second metric to compare the rule to all other association rules that are evaluated. In computing the second metric, the system 1190 adjusts the classification results to correct for likely differences between categories of the training transactions and those of transactions that are expected to be encountered out of sample.

In the training environment, instances in which an association rule matches, indicating that a transaction is a member of a specific category, are referred to as "positives", Instances in which the rule does not match indicates that a transaction is not a member of a specific category are referred to as "negatives".

During the training phase, the system 1190 attributes a true positive categorization to an evaluated association rule when a categorization label indicates a positive classification of a transaction and application of the evaluated rule also yields a positive classification of the transaction. The variable TP represents the overall number of such true positive events attributed to a given rule when the rule is applied to a set of training transactions during its evaluation. Similarly a false positive event is attributed to an evaluated association rule when a classification label indicates a negative classification of a transaction and application of the association rule yields a positive classification of a transaction. The variable FP represents a number of such false positive events attributed to a given rule when the rule is applied to a set of training transactions. A false negative event (FN) is when a rule does not match for a given transaction, but the transaction is a member of the category, while a true negative event (TN) is when a rule does not match for a given transaction and the transaction is not a member of the category.

A user can elect to train the system 1190 with respect to any number of categories. To that end, the system 1190 enables the user to provide inputs at the interface 1180 in order to indicate the categories to be detected during use of the system 1190. The system also enables a user to input a number of association rules (k) for each category that the user would like to review in the graph visualization. Then, in each search, the system 1190 identifies k of the association rules evaluated in the search that are estimated to be most useful for detecting the category. The system 1190 can then display the k rules to the user separately for each category, who in each such case is given the option to select any of the rules for use in detecting the given category. The system 1190 stores the selected rules in memory 1144 for future use in detecting the categories for which they were selected.

Association Rules

The system 1190 uses association rules that involve conjunctive logic and yield a categorization of a transaction based on either the presence or absence of specified items. For example, the following list provides examples of association rules that involve conjunctive logic. In the following paragraphs, this disclosure will explain an example system application that involves applying association rules to textual data represented in a bag of words (BOW) format. The concepts explained by way of the discussion of this example application are applicable in other contexts as well, and should be understood as being relevant to any situation in which association analysis may have value as an analytical tool.

In this particular example, however, the transactions are documents and the items are terms such as words, idiomatic expressions, names, hyphenated word clauses or other recognizable text structures. For instance, the system 1190 disclosed herein might hypothetically use any number of association rules structured along the lines of the following example rules in categorizing a document as belonging to a category of documents related to golf:

1) birdie AND eighteen AND driver AND ball=>golf
2) birdie AND par AND ! halftime=>golf
3) birdie AND par AND ! halftime AND !tackle=>golf
4) birdie AND eighteen AND driver=>golf The four example rules shown above will be discussed in order to explain how the system 1190 described herein forms, evaluates and applies association rules. The discussion will also serve to provide several definitions that will be used throughout the remainder this disclosure. The first example rule involves four terms that may or may not occur in a given document. Each of the terms in the first rule involves a "distinct word". The four distinct terms are golf, eighteen, driver and ball. Because it includes four terms, the first association rule will be referred to as a 4-part rule. Association rules having n items, as described in the remainder of this disclosure, should be understood to be "n-part" association rules.

As will be described in the following paragraphs, each association rule can be used to detect transactions that belong to a specific category (in this example, documents), and those that do not so belong. Thus, an association rule can also include a representation of the category that it is used to detect. Each of the four example association rules shown above is used to classify documents as being related or unrelated to the category of golf. Thus, each of these rules includes the word golf, preceded by the "=>" symbol to indicate that the rule is for classifying documents as belonging or not belonging to the category of documents that are related to golf.

In contrast to the first example association rule, the second association rule involves three terms, and is therefore a three-part rule. Of these three terms, two of the terms include distinct words—birdie, par. The third term (represented as ! halftime) is what will be referred to as a "negation term". A negation term only matches when the term is not present in a document. In the following pages and the drawings of this disclosure, negation terms will be frequently referenced by the "!" symbol being placed in front of a word, name, hyphenated word, or other expression. To that extent, any word, name or other expression directly preceded by the "!" symbol should be understood to be a negated word.

This disclosure will describe association rules by using a referencing system that will now be explained. Given a list of available terms (distinct word terms and negation terms), individual terms on the list can be referenced by letters, such that the terms on the list are ordered alphabetically, based on their respective reference letters. For example, this reference system can be applied to the following list.

birdie
driver
ball
par
PGA
eighteen
!halftime
!tackle

The following list shows how reference letters would be applied to the terms of the list above:

A<=>birdie
B<=>driver
C<=>ball
D<=>par
E<=>PGA
F<=>eighteen
G<=!halftime
H<=>!tackle The alphabetical representation explained above can easily be replicated where numbers or some other system of symbols is used in place of the alphabet.

When terms are referenced in this way, any rule that conjoins terms from the list can be referenced by the reference letters of the conjoined terms. For example, the following examples illustrates this manner of referencing a rule:

birdie AND eighteen AND driver AND ball=>golf⇔
ABCF=>golf birdie AND par AND ! halftime AND !tackle=>golf⇔ ADGH=>golf Moreover, when the category of an association rule (e.g., golf in each of the previous rule examples) is clearly understood, the rule may be referenced only by its terms. Thus, in such a case, the two rules in the example above may be invoked by the representations ABCF and ADGH.

Additionally, because association rules may have only one term, each individual term on a list such as the one discussed previously may be understood to be as a term that can be used to form a multi-part rule, while also representing a one-part rule existing on its own. When such lists are referred to later on in this document, all such terms should be understood to represent both such uses.

In applying a rule to a transaction, whether during a training phase or in production, the system 1190 categorizes the transaction as being either:

a member of the category that the rule is being used to detect; or not a member of the category that the rule is used to detect.

When an association rule that includes only distinct word terms is applied to a document, the system 1190 positively categorizes the document if the document includes each of the distinct words. Otherwise, the document is categorized as a negative. This means that the document is categorized as not belonging to the category.

When a rule includes both distinct word terms and negation terms, the system 100 positively categorizes the document if the document includes each of the distinct words and also omits each of the negated words. Otherwise, the system 1190 negatively categorizes the document.

Thus, in applying the first example rule to a document, whether during a training phase or in production, the system 1190 positively categorizes the document as being a member of the golf category if each of the words "birdie", "eighteen", "driver" and "ball" is found at least once in the document. If the document does not satisfy that condition, the document is negatively classified with respect to the golf category. Similarly, in applying the second example rule to a document, the system 1190 would positively categorize the document as a member of the golf category if and only if the word "halftime" (this treatment is indicated by the "!" in front of the word "halftime") was not found in the document and each of the words "birdie" and "par" appeared in the document at least once.

In training, the system 1190 uses two metrics to evaluate the categorization performance of association rules. These metrics can be applied to rules having any number of items, to include one-part rules. A first metric, referred to as "g-score", is a measure of information gain that can also be used to infer statistical significance. Information gain itself is not formulated for significance testing. However, a g-score is a useful proxy for information gain that also can be evaluated for statistical significance. This is because g-score follows a chi-square distribution, of which the significance values are well-known. The user can specify, via an inputted parameter, the level of statistical significance required (e.g. p<0.01, p<0.001, etc.). During search, the system will then consider for expansion only those rules that show a g-test above this specified cutoff. The g-score of an association rule is calculated as a sum over the 2×2 contingency table containing the numbers of TP, FP, FN, TN yielded by the rule. The g-score is calculated as $$G = 2\sum_i O_i \cdot \ln\left(\frac{O_i}{E_i}\right),$$

where O(i) is the observed value of that cell, and E(i) is the expected value of that cell. So let e(TP), e(FP), e(FN), and e(TN) be the expected frequencies of each of those cells: then $$G = 2*(TP*\ln(TP/e(TP)) + FP*\ln(FP/e(FP)) + TN*\ln(TN/e(TN)) + FN*\ln(FN/e(FN)))$$

The g-score reflects both the information gain of a rule when applied to training documents, and the statistical significance of that performance, if, when we are considering adding an item to an existing rule, we use the TP of the existing rule as the FN of the new rule, and the FP of the existing rule as the TN of the new rule. Thus, during the search, the system 1190 is able to determine whether one rule represents a statistically significant improvement over another rule by computing the g-scores in this manner.

The second metric that the system 1190 uses to evaluate association rules is referred to as estimated precision. Estimated precision is a measure of the expected precision of the rule. If our data were unbiased, we could simply use TP/(TP+FP) for a measure of precision. In that case, if applying an evaluated rule yielded 5 true positive categorizations, and no false positive classifications, then we would say that the rule is accurate 100% of the time. However, the fact that the system 1190 evaluates so many rules renders this measure biased.

As an illustration of how this bias occurs—suppose you asked 30 people to pull out a penny and flip it ten times. Then ask them how many heads they got. You might find a few individuals who got 9 or 10 heads in their flips. That doesn't mean their coins really have a 90% or 100% chance of landing heads. Looking at only the individuals who landed the most heads would result in biased results.

In order to correct for bias effecting the calculated precision of a rule, the system uses a user-inputted parameter m, which is an integer>=1. The value of m indicates the degree of bias expected for the training data (a good value of m can potentially be determined using cross-validation) being used. For a classification rule having i items, the estimated precision is calculated using the following formula. In this case, for a 1-item rule, $\text{err}_{i-1} = 0$.

$$\text{est\_precision}_i(i) = \frac{TP_{i,t} + \frac{P}{N+P}*m}{TP_{i,t} + FP_{i,t} + m} - \text{err}_{i-1}$$

$$\text{err}_i = \text{est\_precision}_i(i) - \text{precision}_i(i) + \text{err}_{i-1}$$

In the formula for estimated precision, m is a constant that the system 100 uses so that the estimated precision metric will be biased in favor of association rules that have small numbers of terms and rules that yield large numbers of positive classifications. For example, consider the golf example described earlier. When we consider the 1-term rule, par, as shown in FIG. 13, TP=12, FP=5, and assume that the user has set m=1. Also assume that there are 1000 total documents in the training set—100 of which are members of the golf category. In this case, precision would be 12/(12+5)=70.59%.

On the other hand, estimated precision would be (12+100/1000*1)/(12+5+1)=67.22%. So we are saying that in the training data, we got over 70% precision, but we think its biased and the expected precision in a different, larger sample would only be about 67%. The difference between those represents err, which is 3.37% (all these can be seen from that figure). Thus when we try to add additional terms onto the rule for par, their estimated precision as measured before will be reduced by an additional 3.37%, so that we favor shorter rules.

The search algorithm that the system 1190 uses to find useful association rules can be best understood by conceptualizing the search space as a tree in which individual candidate association rules are represented by a particular node. Under this framework, the root node represents an origin point at which multiple search path begins. Below the root node, at every $n^{th}$ level of depth, every node represents a unique n-item association rule. Each edge connects individual nodes at an $n^{th}$ level of depth to a node representative of an association rule having the same n items and one additional item.

The structure and nodes of the tree can be determined by the contents of a preliminary rule list that is made up of one-part rules ordered by rule type and descending g-score value. The system 1190 uses preliminary rule lists that are specific to individual categories. For that reason, each search entails generating a preliminary rule list with respect to the category that will be the subject of the search.

The system 1190 generates a preliminary rule list with regard to a given category by first identifying distinct items found in the set of training transactions. In the example case of text, the set of training transactions can be a set of documents, sentences, paragraphs, articles, or the like. The distinct items can include words, names, expressions, recognizable clauses, statements, or other meaningful arrangements of text. In this case, the system 1190 ignores insignificant or generally uninformative words such as pronouns and other heavily used words that are found in most documents. Similarly, when the system 1190 is being used to identify combinations of genes that predict Alzheimers, the system can establish preliminary rule list so that it will not include genes known to be irrelevant to the detection of Alzheimers disease.

Returning to the example case in which the system 1190 categorizes text documents, after significant distinct items are identified, the system 1190 then treats each remaining item as distinct in a one-part association rule and uses each such rule to categorize each of the training set transactions with respect to the category. The system 1190 counts the true-positive, false-positive, true-negative and false-negative categorizations yielded by each rule. Based on this information, the system 1190 calculates the g-score value and estimated precision of each such rule. The system 1190 then removes any items for which the g-test value is not in excess of a predetermined threshold. The system 1190 then checks to see which items are currently among the k-best as to estimated precision and puts those on the k-best rule list. It then removes from the list all items which cannot be improved. The remaining rules are then ordered based on their g-test values, from highest to lowest.

The system 1190 can provide the user with the ability to set the predetermined threshold used in the elimination of one-part association rules from the preliminary rule list. By setting the predetermined threshold, the user can affect the breadth of the search space in which the system 1190 evaluates candidate rules.

The system 1190 can extend the preliminary rule list to include single-word negation items from the items found in the transactions. The system 1190 treats each such negation item as a one-part rule and evaluates these rules in the same manner as described above. The system 1190 discards rules that do not exceed the g-score threshold and sorts rules that can be improved from highest g-score to lowest. The system 1190 then appends the sorted negation terms to the ordered list of distinct words, and the preliminary word list is complete.

FIG. 13 is an example of a preliminary rule list. The preliminary rule list 1300 shown in FIG. 13 includes six one-part rules. In actual practice a preliminary rule list may include as many as thousands of one-part rules. The preliminary rule list includes 2 segments. One segment includes rules A-E. These rules are formed by distinct word terms and are ordered by g-score, from highest score to lowest. The second segment is for rules having a negation term. However, in this particular case, rule F is the only such rule.

The preliminary rule list 1300 includes data with respect the each one-part rule (term). In the column labeled "in", the rule list 1300 provides the numbers of true-positive categorizations of training documents yielded by the six rules (A-F). Similarly, the column labeled "out" provides the numbers of false-positive categorizations. The column labeled "tot" is simply a summation of the "in" and "out" columns.

The preliminary rule list 1300 also includes the g-score computed for each rule. G-scores are shown in the column labeled "g". The +/− labels in the column labeled "dir" are used to label the various rules based on whether or not they include a negation term.

The column "prec" is used to show the precision computed with respect to each rule. A rule's precision is defined as TP/(TP+FP). The est_prec column includes each rule's estimated precision. The explanation of this metric was provided previously.

The p_err column includes the differences between the precision and estimated precision computed with respect to the various rules, and the "_improve" column indicates which rules are improvable (+) or unimprovable (−).

Prior to attempting to expand the rule list, the system 1190 creates a k-best list for storing k association rules and the estimated precision computed for these rules. Later, the k-best list is updated throughout the search to indicate the k association rules that have been evaluated to have the highest estimated precision.

Figure 14A:
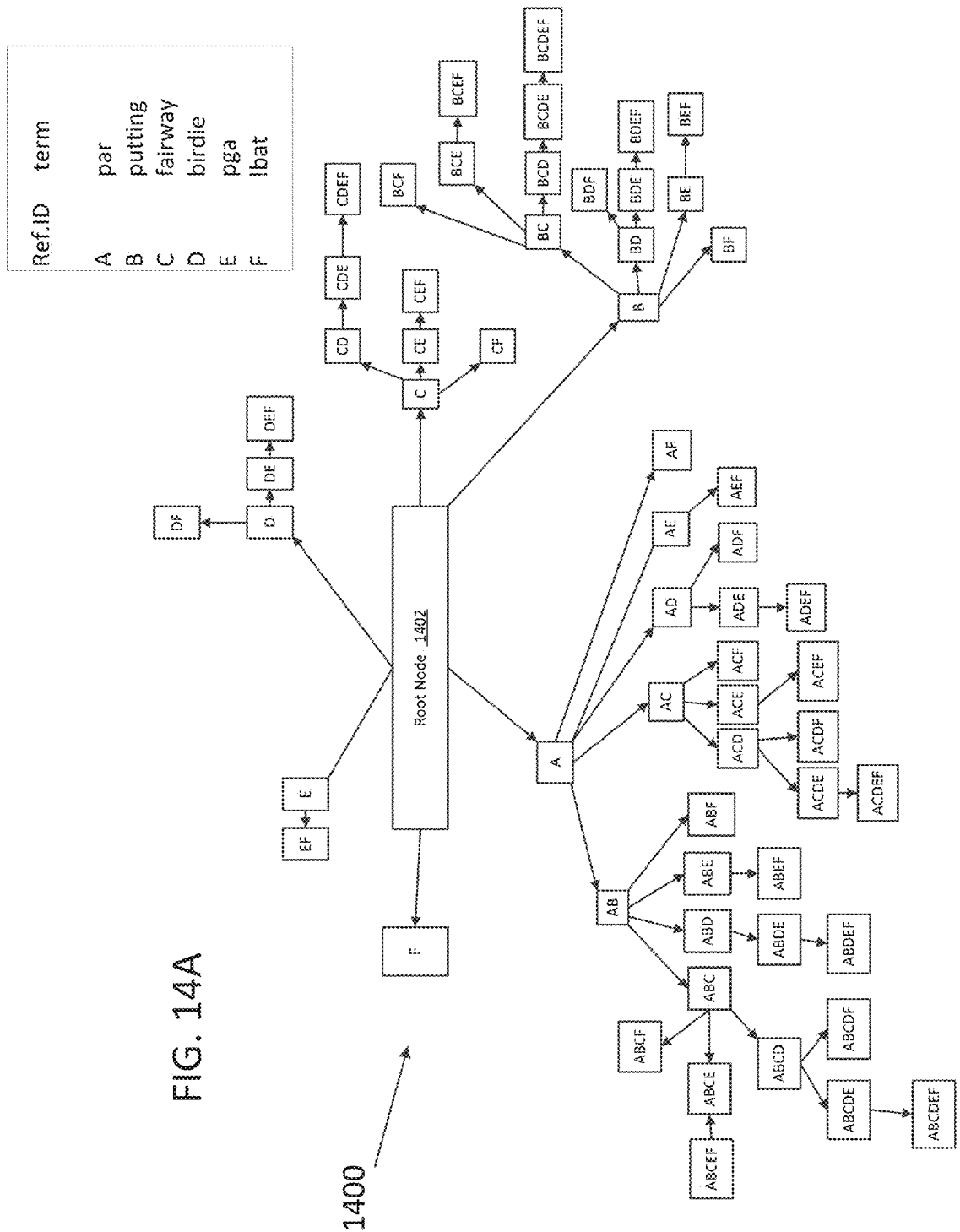
FIG. 14A is an example of a tree that represents a search space within which the transaction classification system is configured to efficiently search for association rules.

FIG. 14 is an example of a tree 1400 used to represent a search space that corresponds to the preliminary rule list 1300 of FIG. 13. The tree represents each of the conjunctive association rules that can be formed from six terms on preliminary rule list 1300. Although the system 1190 need not actually construct a representation of any tree when performing a search, reference to trees structured such as the one shown at 1400 enable the search algorithm that the system 1190 employs to be easily represented, studied and understood.

A tree structured in accordance with certain rules and based on a preliminary rule list referenced by the system 1190 can depict the potential search paths that can be explored when the system 1190 executes the search algorithm. Moreover, such a tree provides that illustration without depicting any search paths that would violate the search constraints. For this reason, just such a tree will be used to explain how the system 1190 executes the modified depth-first search. However, note that in accordance with the best-first metaheuristic used by the system 1190, search paths are expanded in the depthwise direction only so far as the paths incrementally lead to rules with new terms that result in a statistically significant improvement. For this reason, on certain occasions, there might be precise rules that are not evaluated because they are represented by nodes on potential search path that the system does not fully explore in the depthwise direction. This is a tradeoff in which some limited approximations are accepted in order to greatly reduce the processing requirements of the search. Moreover, in many real-world problems, only minute fractions of a percent of possible rules represented by the tree are ultimately examined.

One example set of procedures for assembling a tree such as the one shown in FIG. 14 is as follows:
1) On the preliminary rule list, label the first rule (or term) as A, the second as B, the third as C, and so on. This labeling scheme was described earlier in this disclosure.
2) Taking the preliminary rule list to include exactly n rules, record all permutations of the letters used to represent terms (one-part rules) on the preliminary list. These permutations should include all permutations of between 1 and n letters in which no letter is repeated. Take each of these permutations to represent an association rule in the search space that is a logical conjunction of the terms represented by the permutation letters.
3) In each permutation, order the letters by alphabetical order.
4) Create a node with respect to each such ordered permutation.
5) Create a root node that will represent a starting point of each search path.
6) Label each of the nodes by its respective permutations.
7) At each node:
    a) determine the number of letters (x) in the label.
    b) use a directional edge to connect the node to every other node that is labeled by a permutation having the same x letters and exactly one other letter.
    c) if x=1, use an edge to connect the node to the root node.

By using these procedures to assemble a tree 1400, the nodes of the tree can be used to represent the various candidate association rules in the search space, and the edges can represent possible search paths.

The local search involves "expanding" along multiple search paths originating at the root node 402. Because divergent search paths are explored, the best-first metaheuristic is used to determine the order of branching from the root node 1402, as well as the order of branching from nodes evaluated during the search. That is, the system 1190 can use the best-first metaheuristic to order the exploration of diverging search paths at every operation of search path expansion. The use of the best-first metaheuristic causes the system to detect most of the best rules in the search space early on during the search. For this reason, it is possible for a user to terminate the search prior to completion, and early on in its execution, without causing significantly degraded search results.

Starting from the root node 1402, the term expansion progresses among all encountered search paths that are not subject to an expansion constraint (f) or a path termination constraint. On each search path, the term expansion continues depthwise in this manner until the path leads to a node that is not superior to its parent. A test for superiority of one node over its parent will be explained in subsequent paragraphs. The expansion constraint is an upper limit on the number of search paths that can be explored from any single node beyond the root node 1402. The path termination constraint is invoked when an ideal evaluation condition is found at a node. Moreover, a metaheuristic based on ordered g score is used to select search paths most likely to lead to a useful association rule and constrain growth of the search space.

The system 1190 determines any child node to be an improvement of its parent node when, both of the following conditions are met:

the association rule represented by the child node yields a g-score that reflects a statistically significant improvement in information gain, as compared to the parent node; and the association rule represented by the child node is evaluated to have an estimated precision that is higher than the association rule represented by the parent node. In this regard, the statistically significant/insignificant threshold is based on a cutoff given by the user.

When more than f child nodes of any one parent node satisfy both of these conditions and the rule represented by the parent node is improvable, the system 1190 identifies f of the child nodes at which the g-score improvement is best, expands the search to those nodes, and closes off all search paths that involve any of the remaining child nodes.

The search can be implemented recursively, and involves evaluating the association rule represented by each node that the search visits. The evaluation involves multiple steps. In a first operation, the system 1190 calculates the estimated precision of the association rule and reviews the estimated precision of the lowest scoring association rule on the k-best list.

If the estimated precision computed for the rule under evaluation is one of the k-best, is higher than the parent node, and the g-score for rule improvement is statistically significant, the rule replaces that rule that had previously been $k^{th}$ best. The k-best list is represented by a priority queue that is sorted so that the association rules on the list are ordered by their respective estimated precision. Conversely, if the rule under evaluation is not one of the k-best, the k-best list is left unchanged. In either case, the system 1190 considers further depthwise search expansion to child nodes, provided that the child node is improvable.

The test for whether an evaluated node is improvable is as follows:
  Set the FP to 0, FN to 0 and TN to current FP.
  Compute the g-score and estimated precision of this theoretical "best possible" node to follow the current one using the previously given g-score formula. If and only if that "best possible" node has a statistically significant g score, and its estimated precision is better than current node, the current node is improvable.

In view of these heuristics and constraints, the system 1190 performs the modified depth-first search in accordance with a series of procedures that will be explained through reference to a tree constructed as previously described. The procedures involve the following operations:
1) Start at the root node.
2) Advance the search to all open nodes, as defined below. Advance the search one edge at a time, but subject to and in accordance with the following constraints, metaheuristics, and search ordering guidelines:
    a) Parent/Child—When any two nodes are connected by an edge, one is to be considered a parent node and one is to be considered the child node. In such a case, the child node is the node furthest from the root node. All nodes connected directly to the root node (1-hop) are child nodes of the root node.
    b) Uphill Node—A child node is superior to the parent if the g-score of the new association rule represented by the child (as described earlier) is a statistically significant improvement over the parent. Otherwise the child node is ignored by the search. All nodes connected directly to the root node (1-hop) are superior to the root node.
    c) Open Nodes—Child nodes that are superior to parent nodes and are improvable become open nodes upon the search visiting the parent node, subject to constraint (d) and (e). The search continues until there no open nodes remaining d) Branching/Expansion Constraint (f)—No more than f child nodes of any parent become open nodes. If more than f child nodes are superior to a parent, only the improvable child nodes associated with the highest g scores are considered for expansion.

e) Expansion From the Root Node—Any nodes that represent a one-part association rule formed from a negation term are constrained from being open nodes. The search does not visit these nodes.

f) Prioritization of Open Nodes/Search Order—Incrementally extend the search to open nodes in accordance with the alphabetic ordering of the association rules that the nodes represent. For example, if one open node represents association rule AF and another represents association rule AG, extend the search to AF prior to extending the search to AG. When the search is extended to a node, the node is no longer an open node.

g) Evaluating Association Rule Represented By a Visited Node—When extending the search to a node, calculate the estimated precision of the association rule that the node represents. Update and sort the k-best list if the estimated precision is higher than the estimated precision calculated with respect to any other association rule on the k-best list.

h) Termination Condition—Continue the search until there are no open nodes.

i) k-Best Evaluated Rules—At the end of the search, the association rules on the k-best list are estimated to be the most useful for detecting membership in the category.

Figure 14B:
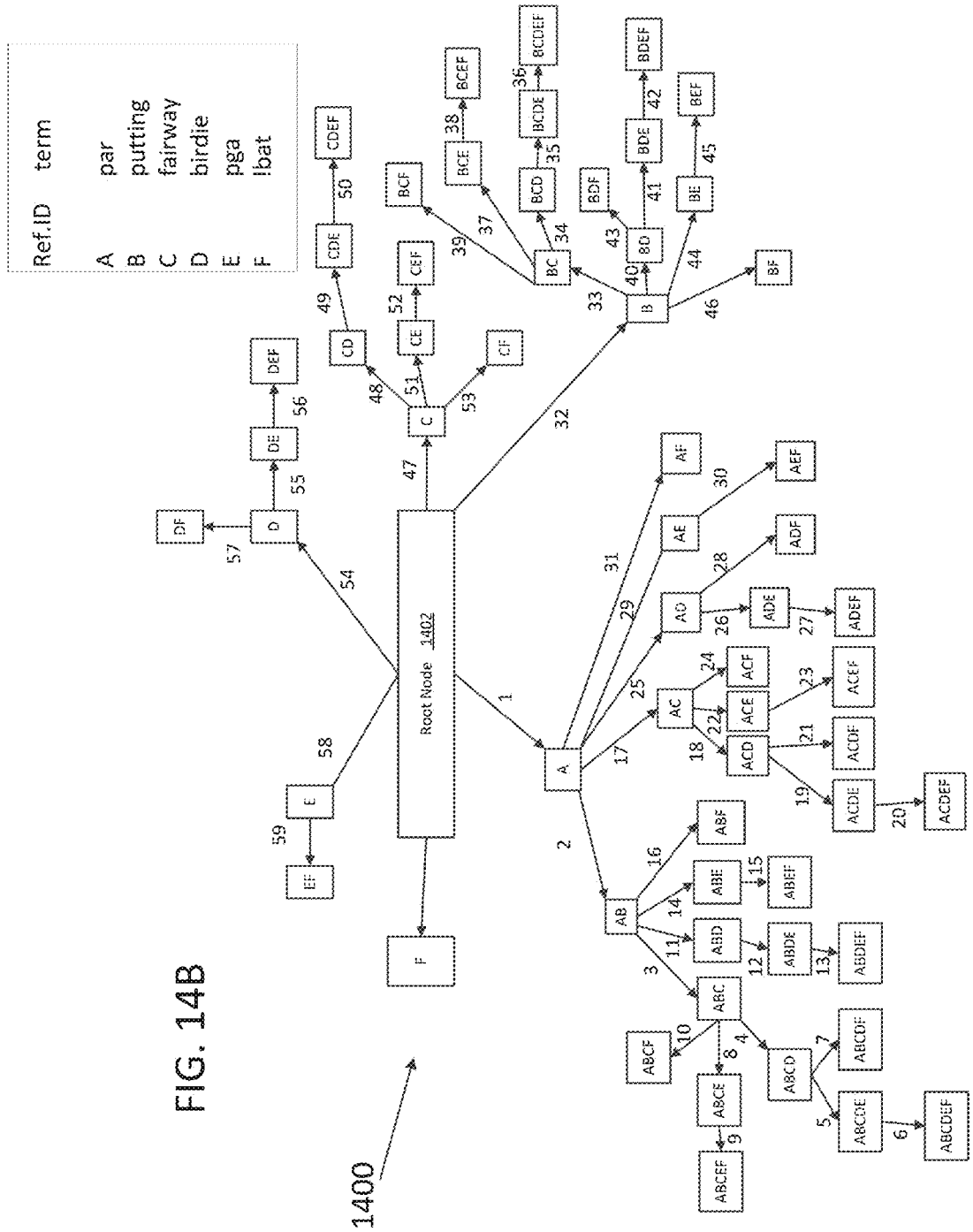
FIG. 14B is an illustration of an example search conducted in the search space represented by the tree of FIG. 14A.

FIG. 14B is intended to show the search order that the system would apply, in an idealized case, to the search space represented by tree 1400. The idealized case assumed in FIG. 14B involves the assumption that the system is operated with unlimited processing resources and the parameter f has therefore been set to infinite. Additionally, a search would progress only as shown in FIG. 14B if the search never encountered an unimprovable rule above the leaf level of the tree, and if all nodes were found to be superior to their parents.

In such a case, FIG. 14B shows that every node (other than nodes representing one-part negation rules) will be visited. Additionally, the numbers attached to the edges of the tree 1400 indicate the order of search. In this idealized situation, the system follows every search path to a leaf of the tree, and the search visits nodes exactly in accordance with the alphabetical ordering of the nodes.

FIG. 15 displays examples of search results that could hypothetically be obtained by using the transaction classification system 1190 to search for 7 best association rules within the search space represented by tree 1400. The k-best rule list yielded by the search is shown at 1602. Moreover, the nodes that represent the association rules on the list are highlighted within the tree 1400. These 7-best rules are ABCD, ABC, ABEF, ACEF, ACD, BCD, BCE.

Figure 16:
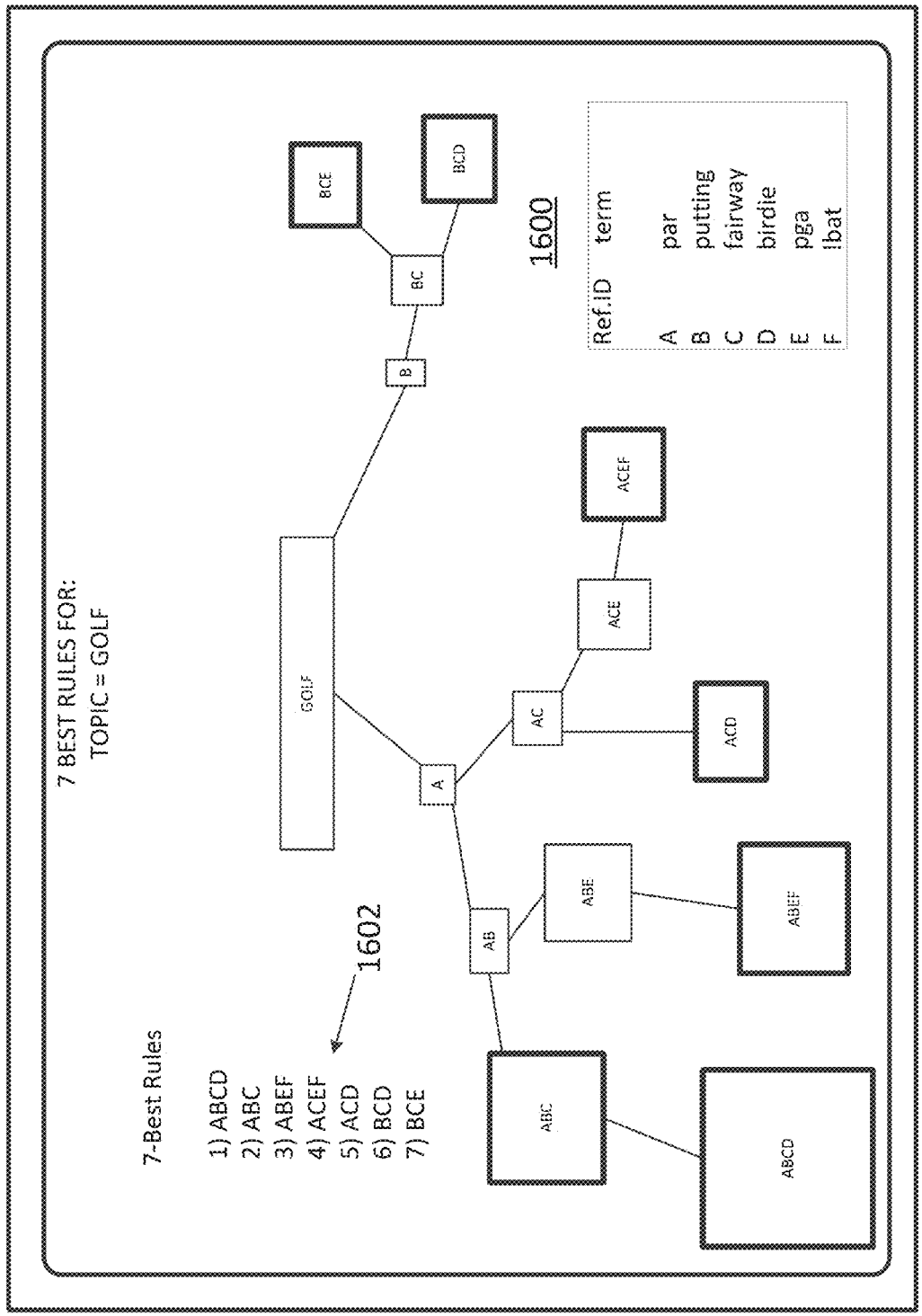
FIG. 16 shows an example interface display presented to a user in order to visually represent seven association rules.

FIG. 16 is an example of a rule search depiction 1600 that the system 1190 can provide for the purpose of enabling a user to see results of a search for association rules conducted with respect to a given topic (or category). The rule search depiction 1600 can be provide in a graphical format that shows the association rules on a k-best list 1502 following a search performed by the system 1190.

The rule search depiction 1600 may use edges to reflect the search paths that lead to the k-best association rules. The depiction 1600 may also use shapes of different size to represent the k-best rules. In this case, the shapes may be sized in proportion to the estimated precision of their respective rules. For example, a large highlighted box is shown around the node that represents rule ABCD. The highlighting of this box indicates that rule ABCD was one of the 7-best rules. Moreover, the fact that the size of the box is larger than all other boxes shown on the display indicates that rule ABCD was found to have a higher estimated precision than all other rules.

The depiction 1600 may also provide the user with features for investigating performance metrics computed for specific rules. These metrics may include metrics such as g-score and estimated precision, statistical significance of the g-score, and the distribution of positive and negative categorizations of training set 1155a transactions. The depiction may further include a feature that the user can activate in order to see training set documents that were categorized correctly or incorrectly when a rule was applied. Additionally, the edges used to connect two association rules may be scaled in thickness so as to represent the information gain of the child rule compared to the parent rule.

Figure 17:
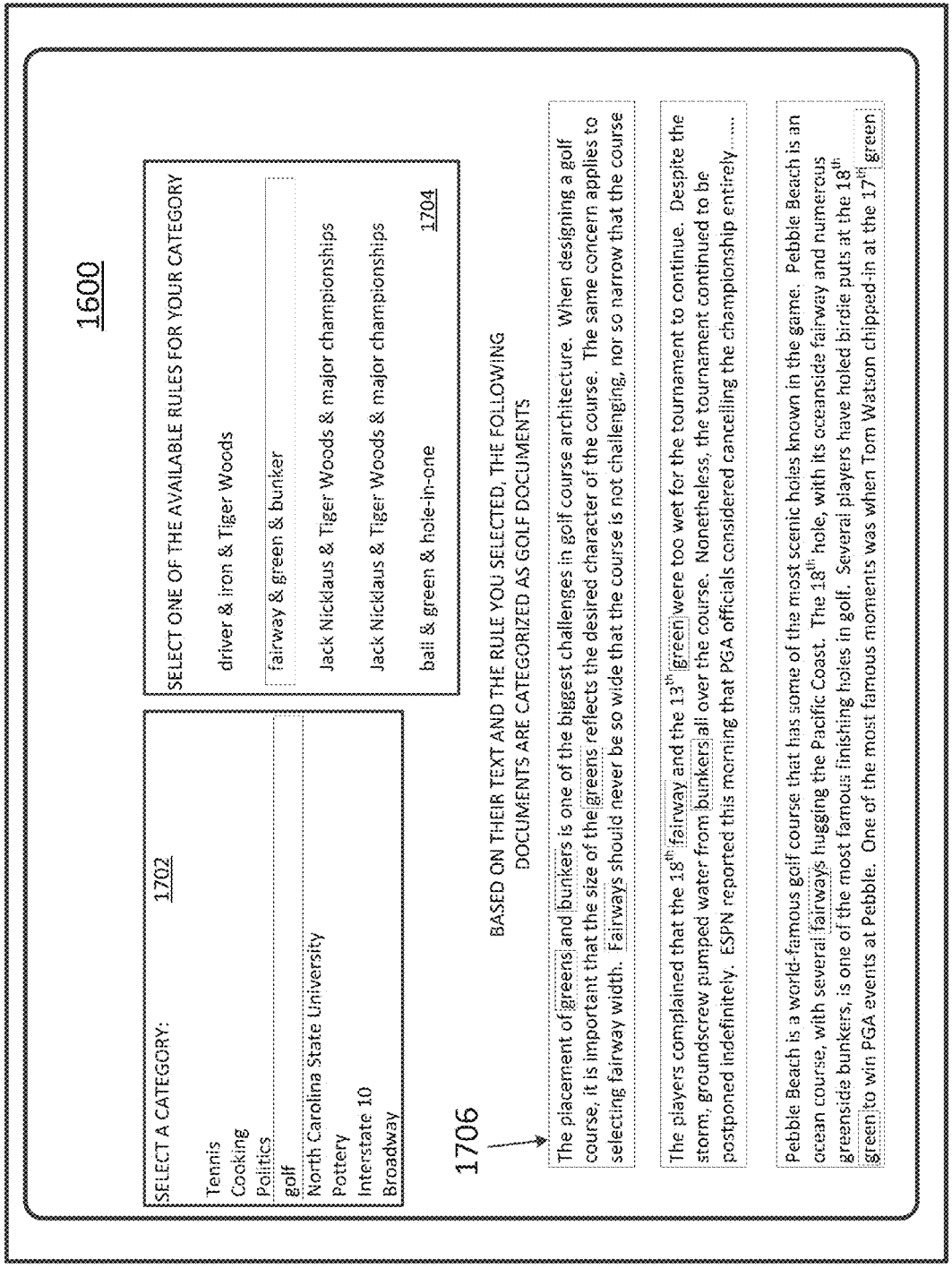
FIG. 17 shows an example interface display presented to a user in order to visually represent seven association rules.

FIG. 17 depicts additional features of a rule search depiction 1600. A user operating system 1190 during display of the rule search depiction may toggle from the view shown in FIG. 16 to the view shown in FIG. 17, and vice versa. As shown in FIG. 17, the rule search depiction 1600 may include a menu 1702 at which a user can select a document category of interest. When the user selects a category, the transaction classification system 1190 displays the k-best association rules found for that category in window 1704. The user can select any subset of the rules in window 1704. For all such rules the user selects, the transaction classification system 1190 displays excerpts 1706 from documents that have been categorized as being related to the selected category. The user can click on any of the excerpts 1706 on the window 1704 to more closely analyze the document from which the excerpt was taken. Additionally, the rule search depiction 1600 displays the excerpts such that words that match a term found in the selected rule are highlighted.

Figure 18:
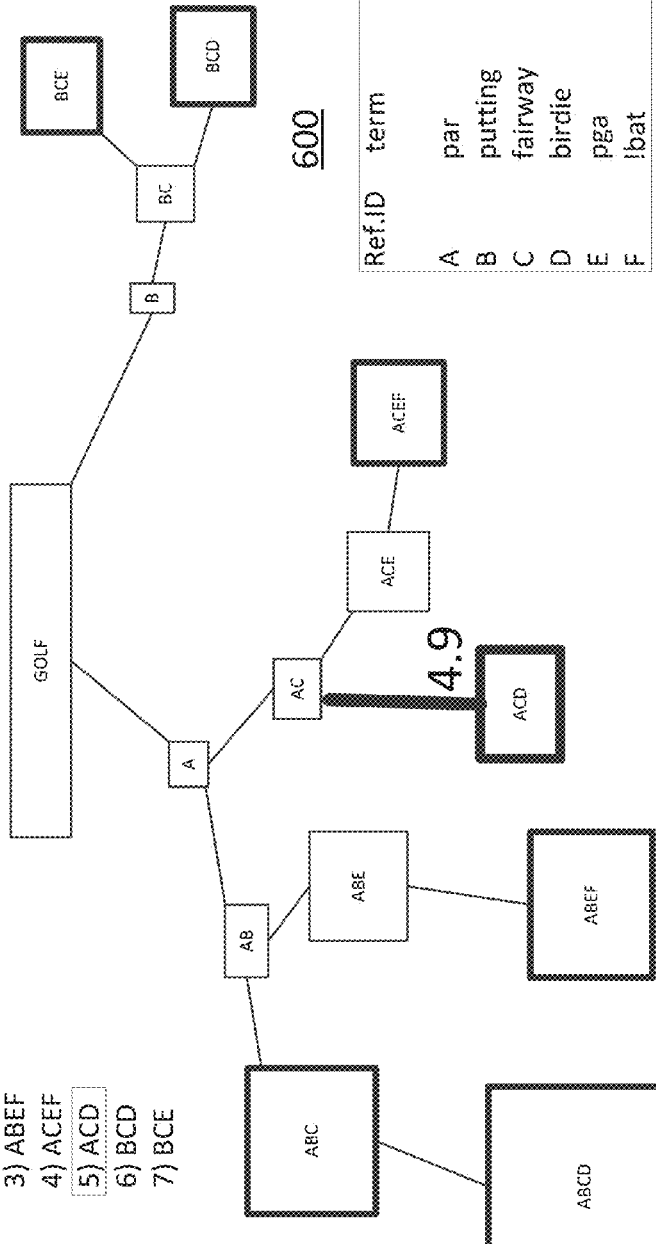
FIGS. 18 and 19 show an example interface display providing visual information about an information gain metric computed with respect to an association rule.
Figure 19:
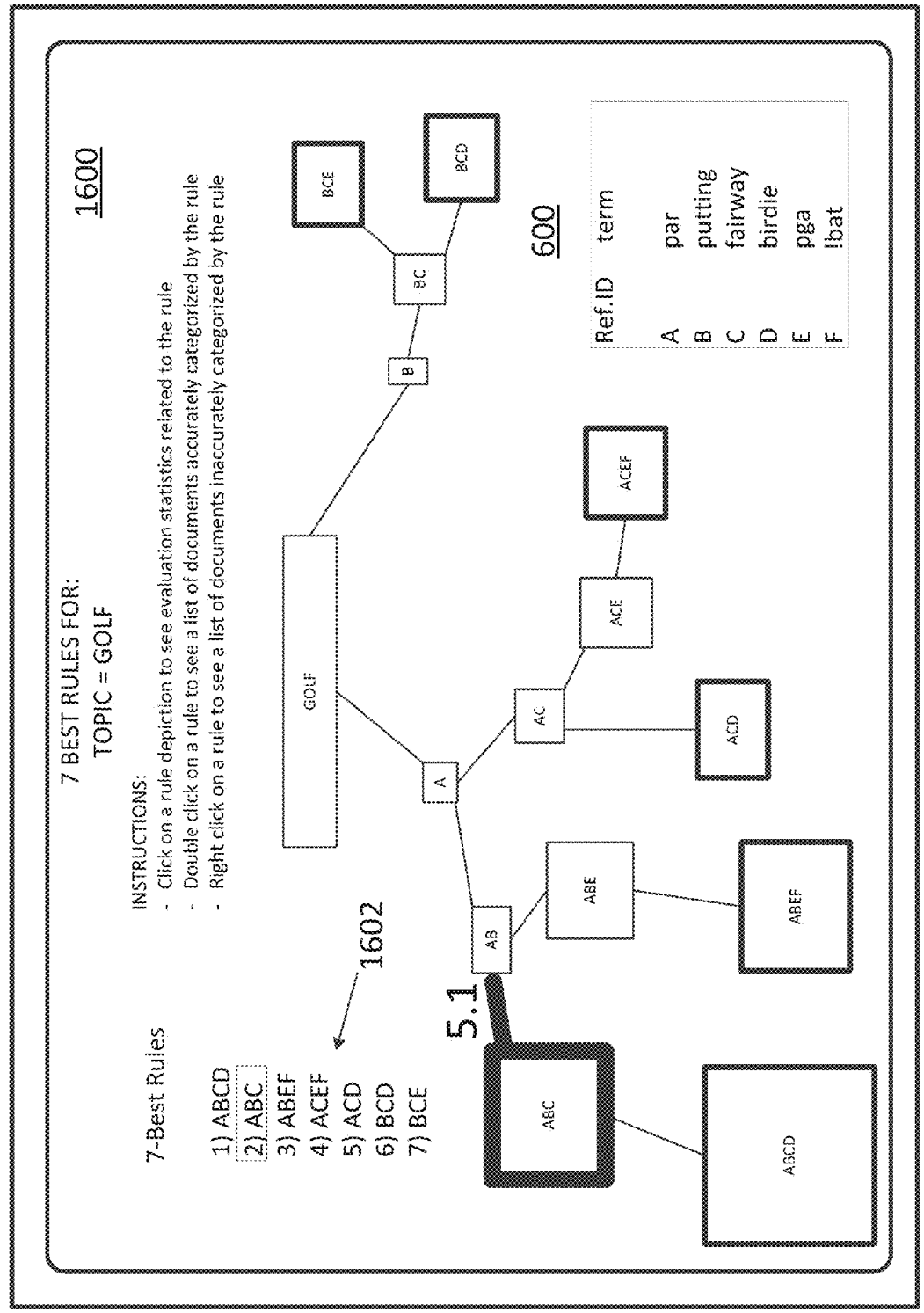

FIGS. 18 and 19 depict examples of the rule search depiction 1600. As shown in FIG. 18, a the transaction classification system 1190, when displaying the rule search depiction 1600, can provide a user with the ability to click on any one of k-best association rules displayed with respect to a document category. When a user selects one of the rules, the edge leading to that rule is highlighted on the rule search depiction. The thickness of the highlighting represents the g-score associated with the selected rule, or some other metric. Additionally, the g-score or other metric can be displayed next to the rule. The activation of this feature is illustrated in FIG. 18 by the box around rule ACD, and in FIG. 19 by the box around rule ACD.

FIG. 20 depicts additional features of the rule search depiction 1600. As shown in FIG. 20, a transaction classification system 1190 provides the user with the ability to draw a box around any combination of nodes that represent k-best rules or nodes that represent other rules. In FIG. 20, a selection box 2002 is shown around nodes AC, ACD, ACE, and ACEF. When the user draws a box in this way, the transaction classification system displays statistics 2004 used to evaluate the rules. In this way, a user may compare any number of similar rules at one time.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session. Some systems may be of other types, designs and configurations.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

What is claimed is:

1. A non-transitory computer-readable storage medium having instructions stored thereon, the instructions executable to cause a data processing apparatus to perform operations including:

accessing a representation of a document category;

accessing a set of multiple documents, each of the documents in the set including a label indicating whether or not the document is included in the category;

assembling a list of terms, wherein the terms include terms found in the documents of the set; and evaluating, using a graph search algorithm, association rules in a search space that includes the evaluated association rules and unevaluated association rules, wherein each of the evaluated association rules and each of the unevaluated association rules includes at least one of the terms in the list, wherein evaluating association rules includes performing the following computer operations with respect to each of the evaluated association rules:

obtaining categorization results by using the evaluated association rule to individually categorize documents of the set; and estimating a precision of the evaluated association rule based on the categorization results; and selecting some of the evaluated association rules based on the precision estimated with respect to each of the evaluated association rules;

displaying a tree graph on a computer display screen such that the tree graph includes a root node and additional nodes, wherein:

the root node represents the document category;

each of the additional nodes represents one of the selected association rules and the respective estimated precision; and edges of the tree graph connect nodes that represent selected association rules sharing terms in common.

2. The non-transitory computer-readable storage medium of claim 1, wherein the operations further include:

providing a node selection feature in conjunction with the tree graph, wherein the node selection feature facilitates use of the computer display screen for selecting one or more of the additional nodes;

receiving a selection of a first one of the additional nodes, wherein the selection is made using the node selection feature; and in response to receiving the selection, displaying statistical information regarding the selected association rule that is represented by the first one of the additional nodes.

3. The non-transitory computer-readable storage medium of claim 1, wherein the operations further include:

providing a node selection feature in conjunction with the tree graph, wherein the node selection feature facilitates use of the computer display screen for selecting one or more of the additional nodes;

receiving a selection of a first one of the additional nodes, wherein the selection is made using the node selection feature, and wherein the first one of the additional nodes represents a first one of the selected association rules; and displaying representations of documents of the set categorized as being included in the document category during evaluation of the first one of the selected association rules.

4. The non-transitory computer-readable storage medium of claim 3, wherein the operations further include:
  receiving an input that identifies at least one of the selected association rules as being applicable to categorizing documents with regard to the document category;
  storing the selected association rules identified as being applicable;
  accessing an additional set of documents; and
  using the stored association rules to categorize documents of the additional set with regard to the document category.

5. The non-transitory computer-readable storage medium of claim 1, wherein the operations further include:
  computing multiple measures of information gain, wherein the multiple measures of information gain include information gain of each of the terms in the list, and wherein each of the measures of information gain is computed with regard to the document category.

6. The non-transitory computer-readable storage medium of claim 5, wherein the tree graph:
  associates each of the edges with one of the measures of information gain; and
  is configured to:
    receive an input that represents a selected one of the edges; and
    display the measure of information gain associated with the selected one of the edges.

7. The non-transitory computer-readable storage medium of claim 1, wherein individually categorizing documents includes making a categorization decision with respect to each of the documents of the set, wherein each of the categorization decisions involves categorizing the respective document as:
  associated with the document category; or
  not associated with the document category.

8. The non-transitory computer-readable storage medium of claim 1, wherein each of the additional nodes of the tree graph is displayed in a manner that reflects the precision estimated with respect to the selected association rule that the additional node represents.

9. The non-transitory computer-readable storage medium of claim 1, wherein:
  the document category is defined with respect to a topic such that documents in which the topic appears are associated with the document category and documents in which the topic does not appear are not associated with the document category.

10. A computer-implemented method, comprising:
  accessing a representation of a document category;
  accessing a set of multiple documents, each of the documents in the set including a label indicating whether or not the document is included in the category;
  assembling a list of terms, wherein the terms include terms found in the documents of the set; and
  evaluating, using a graph search algorithm, association rules in a search space that includes the evaluated association rules and unevaluated association rules, wherein each of the evaluated association rules and each of the unevaluated association rules includes at least one of the terms in the list, wherein evaluating association rules includes performing the following computer operations with respect to each of the evaluated association rules:
    obtaining categorization results by using the evaluated association rule to individually categorize documents of the set; and
    estimating a precision of the evaluated association rule based on the categorization results; and
  selecting some of the evaluated association rules based on the precision estimated with respect to each of the evaluated association rules;
  displaying a tree graph on a computer display screen such that the tree graph includes a root node and additional nodes, wherein:
    the root node represents the document category;
    each of the additional nodes represents one of the selected association rules and
    the respective estimated precision; and
    edges of the tree graph connect nodes that represent selected association rules sharing terms in common.

11. The method of claim 10, further comprising:
  providing a node selection feature in conjunction with the tree graph, wherein the node selection feature facilitates use of the computer display screen for selecting one or more of the additional nodes;
  receiving a selection of a first one of the additional nodes, wherein the selection is made using the node selection feature; and
  in response to receiving the selection, displaying statistical information regarding the selected association rule that is represented by the first one of the additional nodes.

12. The method of claim 10, further comprising:
  providing a node selection feature in conjunction with the tree graph, wherein the node selection feature facilitates use of the computer display screen for selecting one or more of the additional nodes;
  receiving a selection of a first one of the additional nodes, wherein the selection is made using the node selection feature, and wherein the first one of the additional nodes represents a first one of the selected association rules; and
  displaying representations of documents of the set categorized as being included in the document category during evaluation of the first one of the selected association rules.

13. The method of claim 12, further comprising:
  receiving an input that identifies at least one of the selected association rules as being applicable to categorizing documents with regard to the document category;
  storing the selected association rules identified as being applicable;
  accessing an additional set of documents; and
  using the stored association rules to categorize documents of the additional set with regard to the document category.

14. The method of claim 10, further comprising:
  computing multiple measures of information gain, wherein the multiple measures of information gain include information gain of each of the terms in the list, and wherein each of the measures of information gain is computed with regard to the document category.

15. The method of claim 14, wherein the tree graph:
  associates each of the edges with one of the measures of information gain; and
  is configured to:
    receive an input that represents a selected one of the edges; and
    display the measure of information gain associated with the selected one of the edges.

16. The method of claim 10, wherein individually categorizing documents includes making a categorization decision with respect to each of the documents of the set, wherein each of the categorization decisions involves categorizing the respective document as:
  associated with the document category; or
  not associated with the document category.

17. The method of claim 10, wherein each of the additional nodes of the tree graph is displayed in a manner that reflects the precision estimated with respect to the selected association rule that the additional node represents.

18. The method of claim 10, wherein:
the document category is defined with respect to a topic such that documents in which the topic appears are associated with the document category and documents in which the topic does not appear are not associated with the document category.

19. A system, comprising:
one or more data processors; and
a non-transitory computer readable storage medium containing instructions which when executed on the one or more data processors, cause the one or more processors to perform operations including:
accessing a representation of a document category;
accessing a set of multiple documents, each of the documents in the set including a label indicating whether or not the document is included in the category;
assembling a list of terms, wherein the terms include terms found in the documents of the set; and
evaluating, using a graph search algorithm, association rules in a search space that includes the evaluated association rules and unevaluated association rules, wherein each of the evaluated association rules and each of the unevaluated association rules includes at least one of the terms in the list, wherein evaluating association rules includes performing the following computer operations with respect to each of the evaluated association rules:
obtaining categorization results by using the evaluated association rule to individually categorize documents of the set; and
estimating a precision of the evaluated association rule based on the categorization results; and
selecting some of the evaluated association rules based on the precision estimated with respect to each of the evaluated association rules;
displaying a tree graph on a computer display screen such that the tree graph includes a root node and additional nodes, wherein:
the root node represents the document category;
each of the additional nodes represents one of the selected association rules and
the respective estimated precision; and
edges of the tree graph connect nodes that represent selected association rules sharing terms in common.

20. The system of claim 19, wherein individually categorizing documents includes making a categorization decision with respect to each of the documents of the set, wherein each of the categorization decisions involves categorizing the respective document as:
associated with the document category; or
not associated with the document category.

21. The system of claim 19, wherein each of the additional nodes of the tree graph is displayed in a manner that reflects the precision estimated with respect to the selected association rule that the additional node represents.

22. The system of claim 19, wherein the operations further include:
providing a node selection feature in conjunction with the tree graph, wherein the node selection feature facilitates use of the computer display screen for selecting one or more of the additional nodes;
receiving a selection of a first one of the additional nodes, wherein the selection is made using the node selection feature; and
in response to receiving the selection, displaying statistical information regarding the selected association rule that is represented by the first one of the additional nodes.

23. The system of claim 19, wherein the operations further include:
providing a node selection feature in conjunction with the tree graph, wherein the node selection feature facilitates use of the computer display screen for selecting one or more of the additional nodes;
receiving a selection of a first one of the additional nodes, wherein the selection is made using the node selection feature, and wherein the first one of the additional nodes represents a first one of the selected association rules; and
displaying representations of documents of the set categorized as being included in the document category during evaluation of the first one of the selected association rules.

24. The system of claim 23, wherein the operations further include:
receiving an input that identifies at least one of the selected association rules as being applicable to categorizing documents with regard to the document category;
storing the selected association rules identified as being applicable;
accessing an additional set of documents; and
using the stored association rules to categorize documents of the additional set with regard to the document category.

25. The system of claim 19, wherein the operations further include:
computing multiple measures of information gain, wherein the multiple measures of information gain include information gain of each of the terms in the list, and wherein each of the measures of information gain is computed with regard to the document category.

26. The system of claim 25, wherein the tree graph:
associates each of the edges with one of the measures of information gain; and
is configured to:
receive an input that represents a selected one of the edges; and
display the measure of information gain associated with the selected one of the edges.

27. The system of claim 19, wherein:
the document category is defined with respect to a topic such that documents in which the topic appears are associated with the document category and documents in which the topic does not appear are not associated with the document category.

* * * * *